United States Patent
Eldeeb et al.

(10) Patent No.: US 8,788,560 B2
(45) Date of Patent: Jul. 22, 2014

(54) DECIMAL ELEMENTARY FUNCTIONS COMPUTATION

(75) Inventors: Tarek Eldeeb, Cairo (EG); Hossam Aly Hassan Fahmy, Cairo (EG); Mahmoud Y. Hassan, Cairo (EG)

(73) Assignee: SilMinds, LLC, Egypt, Cairo (EG)

( * ) Notice: Subject to any disclaimer, the term of this patent is extended or adjusted under 35 U.S.C. 154(b) by 441 days.

(21) Appl. No.: 13/293,061

(22) Filed: Nov. 9, 2011

(65) Prior Publication Data

US 2013/0117341 A1   May 9, 2013

(51) Int. Cl.
 *G06F 7/38* (2006.01)
(52) U.S. Cl.
 USPC ....................................................... 708/495
(58) Field of Classification Search
 CPC ..... G06F 7/572; G06F 7/49905; G06F 7/483;
  G06F 9/3001; G06F 7/4876; G06F 7/556;
  G06F 7/4833; G06F 1/0307; G06F 1/0356;
  H03M 7/50
 USPC ................................................. 708/495, 517
 See application file for complete search history.

(56) References Cited

U.S. PATENT DOCUMENTS

| | | | | |
|---|---|---|---|---|
| 7,827,451 | B2* | 11/2010 | Bohizic et al. | 714/724 |
| 2008/0270500 | A1* | 10/2008 | Lundvall et al. | 708/495 |
| 2008/0270506 | A1* | 10/2008 | Lundvall et al. | 708/495 |
| 2012/0259904 | A1* | 10/2012 | Bishop | 708/503 |

OTHER PUBLICATIONS

Cowlishaw, M., "Decimal Floating-Point: Algorism for Computers," in Proceedings of the 16th IEEE Symposium on Computer Arithmetic (ARITH'03), Jun. 2003 (8 pages).
Chen, D. et al., "A 32-bit Decimal Floating-Point Logarithmic Converter," in Proceedings of the 19th IEEE Symposium on Computer Arithmetic (ARITH'09), Jun. 2009 (9 pages).
Chen, D. et al., "A New Decimal Antilogarithmic Converter," in Proceedings of the IEEE International Symposium on Circuits and Systems (ISCAS), May 2009 (4 pages).
Lefevre, V. et al., "Towards Correctly Rounded Transcendentals," in Proceedings of the 13th IEEE Symposium on Computer Arithmetic (ARITH'97), Jul. 1997 (6 pages).
Pineiro, J. A. et al., "Algorithm and Architecture for Logarithm, Exponential, and Powering Computation," IEEE Transactions on Computers, vol. 53, No. 9, Sep. 2004 (12 pages).
Pineiro, J. A. et al., "High-Radix Logarithm with selection by Rounding: Algorithm and Implementation," Journal of VLSI Signal Processing, vol. 40, No. 1, Mar. 2005 (15 pages).

(Continued)

*Primary Examiner* — Tan V. Mai
(74) *Attorney, Agent, or Firm* — Osha Liang LLP

(57) ABSTRACT

A method for executing a decimal elementary function (DEF) computation from multiple decimal floating-point operands, including: extracting mantissae and exponents from the operands; generating normalized mantissae by shifting the mantissae based on the number of leading zeros; calculating a plurality of approximations for a logarithm of the first normalized mantissa; calculating, using the plurality of approximations for the logarithm, a plurality of approximations for a product of the second normalized mantissa and a sum based on the logarithm of the first normalized mantissa and an exponent; generating a plurality of shifted values by shifting the plurality of approximations for the product; generating a plurality of fraction components from the plurality of shifted values; calculating an antilog based on the plurality of fraction components; and outputting a decimal floating-point result of the DEF computation comprising a resultant mantissa based on the antilog and a resultant biased exponent.

25 Claims, 12 Drawing Sheets

(56) References Cited

OTHER PUBLICATIONS

Raafat, R. et al., "A Decimal Fully Parallel and Pipelined Floating Point Multiplier," in Proceedings of the 42nd Asilomar Conference on Signals, Systems and Computers, Oct. 2008 (5 pages).

Fahmy, H. et al., "Energy and Delay Improvement via Decimal Floating Point Units," in Proceedings of the 19th IEEE Symposium on Computer Arithmetic (ARITH'09), Jun. 2009 (4 pages).

* cited by examiner

| Group | Operation | Function | Domain | Modifications |
|---|---|---|---|---|
| 0 | pow(x,y) | $x^y$ | $[-\infty, +\infty] \times [-\infty, +\infty]$ | This is the basic power function. |
| | pown(x,n) | $x^n$ | $[-\infty, +\infty] \times Z$ | No major change. |
| | powr(x,y) | $x^y$ | $[0, +\infty] \times [-\infty, +\infty]$ | No major change. |
| 1 | log10 | $log_{10}(x)$ | $[0, +\infty]$ | Result of the first stage '$Log_{10}$' is forwarded to the rounder. |
| | log2 | $log_2(x)$ | | The multiplicand is forced to $1/Log_{10}(2)$, and the result of the second stage 'multiplier' is forwarded to the rounder. |
| | log | $log_e(x)$ | | The multiplicand is forced to $1/Log_{10}(e)$, and the result of the second stage 'multiplier' is forwarded to the rounder. |
| 2 | log10p1 | $log_{10}(1+x)$ | $[-1, +\infty]$ | A new initial stage is introduced to add '1' to Operand 'x', then changes from group (1) are applied. |
| | log2p1 | $log_2(1+x)$ | | |
| | logp1 | $log_e(1+x)$ | | |
| 3 | exp10 | $10^x$ | $[-\infty, +\infty]$ | The first stage is skipped. A value is chosen from $Log_{10}(10) = 1$, $Log_{10}(2)$ or $Log_{10}(e)$ according to the function to be forced to the output of the first stage. |
| | exp2 | $2^x$ | | |
| | exp | $e^x$ | | |
| 4 | exp10m1 | $10^x - 1$ | $[-\infty, +\infty]$ | A final stage is added to subtract '1' from the result, after applying changes from group (3). |
| | exp2m1 | $2^x - 1$ | | |
| | expm1 | $e^x - 1$ | | |
| 5 | compound(x,n) | $(1+x)^n$ | $[-1, +\infty] \times Z$ | The new initial addition stage from group (2) is used to add '1' to the operand. |

Table 1.12: Supporting More Elementary Functions

| clk | en | Product-shft-frac | prev | crnt | input | inc | dec | antilog |
|---|---|---|---|---|---|---|---|---|
| 0 | 1 | −0.09690999999999999999 | | | | | | 09999999999999999999 |
| 1 | 1 | −0.08690999999999999999 | - | 9 | 096 | 0 | 0 | 08000000000000000000 |
| 2 | 1 | −0.09691000000999999999 | 6 | 9 | 009 | 0 | 0 | 08000000000000000001 |
| 3 | 1 | −0.09691001199999999999 | 9 | 0 | 000 | 1 | 0 | 08000000000000000002 |
| 4 | 1 | −0.09691001289999999999 | 1 | 0 | 010 | 0 | 0 | 08000000000000000003 |
| 5 | 1 | −0.09691001301999999999 | 0 | 0 | 000 | 0 | 0 | 08000000000000000004 |
| 6 | 1 | −0.09691001300799999999 | 0 | 1 | 001 | 0 | 0 | 08000000000000000005 |
| 7 | 1 | −0.09691001300799999999 | 1 | 3 | 003 | 0 | 0 | 08000000000000000006 |
| 8 | 1 | −0.09691001300805999999 | 3 | 0 | 000 | 0 | 0 | 08000000000000000007 |
| 9 | 1 | −0.09691001300805699999 | 0 | 0 | 008 | 0 | 0 | 08000000000000000008 |
| 10 | 1 | −0.09691001300805699999 | 0 | 0 | 000 | 0 | 0 | 08000000000000000009 |
| 11 | 1 | −0.09691001300805639999 | 0 | 5 | 005 | 0 | 0 | 08000000000000000010 |
| 12 | 1 | −0.09691001300805641499 | 8 | 6 | 006 | 0 | 0 | 08000000000000000011 |
| 13 | 1 | −0.09691001300805641439 | 5 | 4 | 004 | 0 | 0 | 08000000000000000012 |
| 14 | 1 | −0.09691001300805641436 | 6 | 1 | 001 | 0 | 0 | 08000000000000000013 |
| 15 | 1 | −0.09691001300805641435 | 4 | 4 | 004 | 0 | 0 | 08000000000000000014 |
| 16 | 1 | −0.09691001300805641435 | 1 | 3 | 003 | 0 | 0 | 08000000000000000015 |
| 17 | 1 | −0.09691001300805641435 | 4 | 5 | 005 | 0 | 0 | 08000000000000000016 |
| 18 | 0 | | 3 | | | | | |

FIG. 11

DECIMAL ELEMENTARY FUNCTIONS COMPUTATION

BACKGROUND

Decimal arithmetic has a growing need in many commercial applications, financial applications, green energy applications, billing applications, and database systems where binary arithmetic is not sufficient because of the inexact mapping between some decimal and binary numbers. For example, the decimal number 0.1 does not have an exact binary representation. Moreover, decimal arithmetic is the norm of the human calculations.

SUMMARY OF INVENTION

In general, in one aspect, the invention relates to a method for executing a decimal elementary function (DEF) computation from a first decimal floating-point operand (DFPO) operand and a second DFPO. The method comprises: extracting a first mantissa and a first biased exponent from the first DFPO and a second mantissa and a second biased exponent from the second DFPO; generating a first normalized mantissa by shifting the first mantissa based on a number of leading zeros in the first mantissa; generating a second normalized mantissa by shifting the second mantissa based on a number of leading zeros in the second mantissa; calculating, using a decimal logarithm hardware unit (DLHU) implementing a first digit recurrence algorithm, a plurality of approximations for a logarithm of the first normalized mantissa; calculating, using a decimal multiplier hardware unit (DMHU) and the plurality of approximations for the logarithm, a plurality of approximations for a product of the second normalized mantissa and a first sum based on the logarithm of the first normalized mantissa and the first biased exponent; generating a plurality of shifted values by shifting the plurality of approximations for the product based on the second biased exponent; generating a plurality of fraction components from the plurality of shifted values; calculating, using a decimal antilogarithm hardware unit (DAHU) implementing a second digit recurrence algorithm, an antilog based on the plurality of fraction components; and outputting a decimal floating-point result of the DEF computation comprising a resultant mantissa based on the antilog and a resultant biased exponent based on at least one integer component of at least one of the plurality of shifted values.

In general, in one aspect, the invention relates to a system for executing a decimal elementary function (DEF) computation from a first decimal floating-point operand (DFPO) operand and a second DFPO. The system comprises: an input processing hardware unit (IPHU) configured to: generate a first normalized mantissa from a first mantissa extracted from the first DFPO based on a number of leading zeros in the first mantissa; and generate a second normalized mantissa from a second mantissa extracted from the second DFPO based on a number of leading zeros in the second mantissa; a decimal logarithm hardware unit (DLHU) configured to calculate a plurality of approximations for a logarithm of the first normalized mantissa using a first digit recurrence algorithm; a decimal multiplier hardware unit (DMHU) configured to calculate a plurality of approximations for a product of the second normalized mantissa and a first sum using the plurality of approximations for the logarithm, wherein the first sum is based on the logarithm of the first normalized mantissa and a first biased exponent extracted from the first DFPO; a shifter configured to generate a plurality of shifted values by shifting the plurality of approximations for the product based on a second biased exponent extracted from the second DFPO; a decimal antilogarithm hardware unit (DAHU) configured to calculate, using a second digit recurrence algorithm, an antilog based on a plurality of fraction components generated from the plurality of shifted values; and an output formulation hardware unit configured to generate a decimal floating-point result of the DEF comprising a resultant mantissa based on the antilog and a resultant biased exponent based on at least one integer component of at least one of the plurality of shifted values.

In general, in one aspect, the invention relates to a system for calculating a logarithm of a decimal floating-point operand (DFPO) to a base (B). The system comprises: an input processing hardware unit (IPHU) configured to: extract a mantissa and a biased exponent from the DFPO; and generate a normalized mantissa by shifting the mantissa based on a number of leading zeros in the mantissa; a decimal logarithm hardware unit (DLHU) configured to calculate a plurality of approximations for a logarithm of the normalized mantissa to base 10 using a digit recurrence algorithm; a decimal multiplier hardware unit (DMHU) configured to calculate a product of a sum and an inverse of a logarithm of B to base 10 using the plurality of approximations, wherein the sum is based on the biased exponent and the logarithm of the normalized mantissa to base 10; and an output formulation hardware unit configured to generate a decimal floating-point result of the logarithm of the DFPO comprising a resultant mantissa based on the product and a resultant biased exponent based on the exponent and the number of leading zeros.

In general, in one aspect, the invention relates to a system for calculating a base (B) raised to a decimal floating-point operand (DFPO). The system comprises: an input processing hardware unit configured to: extract a mantissa and a biased exponent from the DFPO; and generate a normalized mantissa by shifting the mantissa based on a number of leading zeros in the mantissa; a decimal multiplier hardware unit (DMHU) configured to calculate a product of the normalized mantissa and a logarithm of B to base 10; a shifter configured to generated a shifted value by shifting the product based on the biased exponent and the number of leading zeros; a decimal antilogarithm hardware unit (DAHU) configured to calculate an antilog of a fraction component of the shifted value using a digit recurrence algorithm; and an output formulation hardware unit (OFHU) configured to generate a decimal floating-point result comprising a resultant mantissa based on the antilog and a resultant biased exponent based on at least an integer component of the shifted value.

Other aspects of the invention will be apparent from the following description and the appended claims.

BRIEF DESCRIPTION OF DRAWINGS

Figure 10:
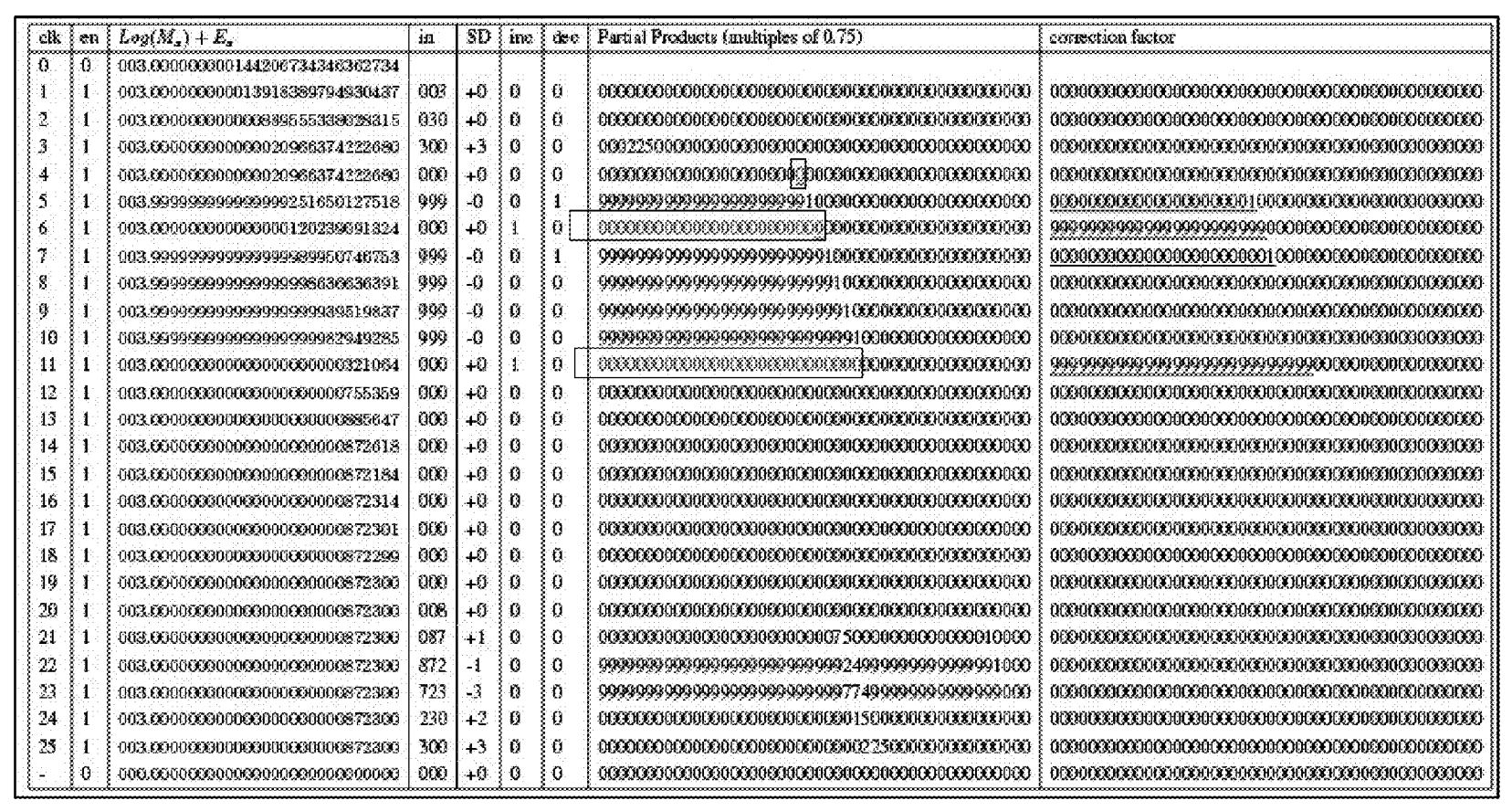

FIG. 9-11 show tables in accordance with one or more embodiments of the invention.

DETAILED DESCRIPTION

Figure 1:
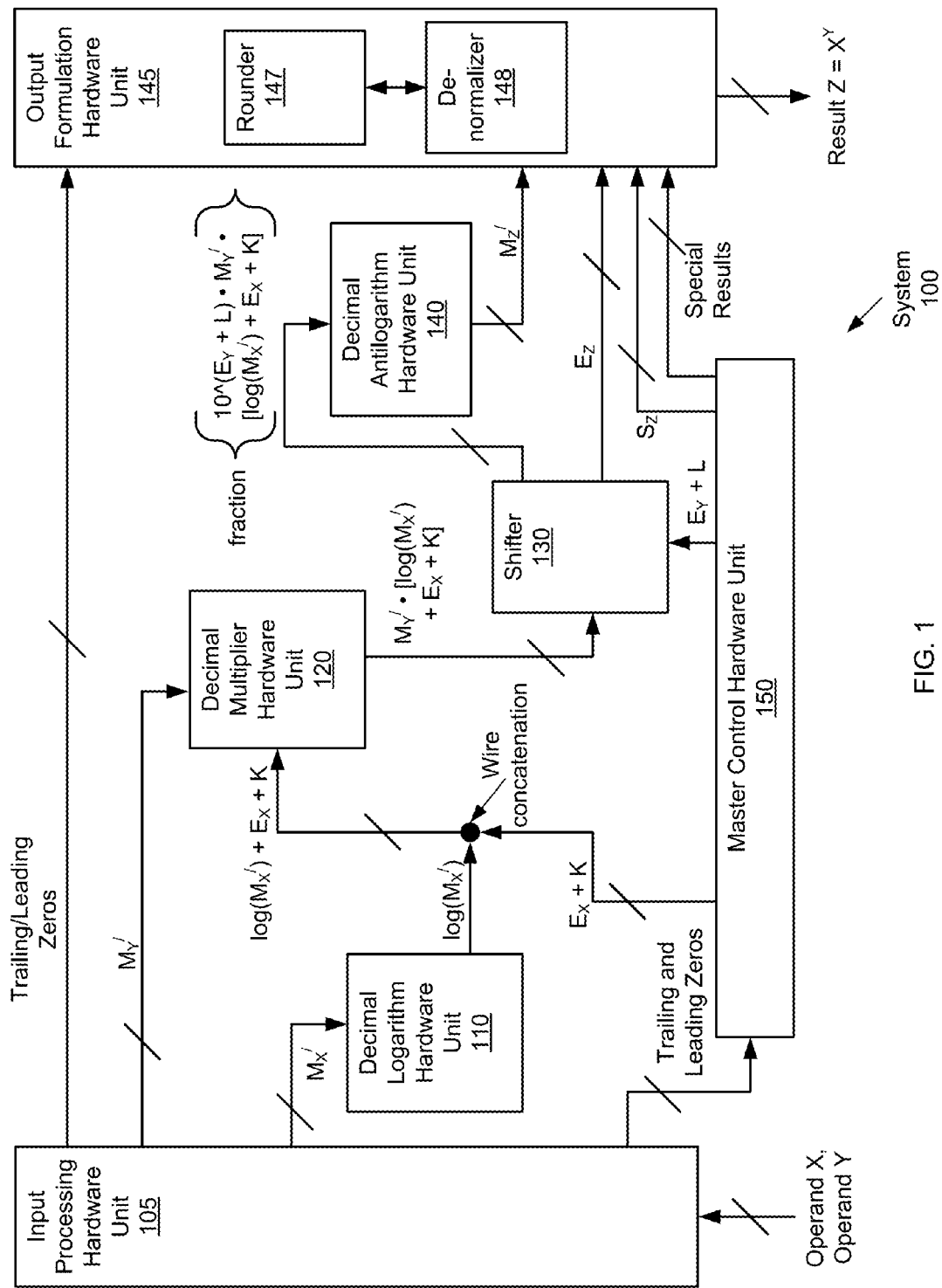
FIG. 1 shows a block diagram depicting a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for executing a decimal elementary functions computation (e.g., a decimal power computation: $X^Y$), where both operators (X, Y) are in decimal floating-point representations. Accordingly, assume X has an absolute value of $M_X \cdot 10^{\wedge}(E_X)$ and Y has an absolute value of $M_Y \cdot 10^{\wedge}(E_Y)$. Then $X^Y = 10^{\wedge}(Y \cdot \log X) = 10^{\wedge}[M_Y \cdot 10^{\wedge}(E_Y) \cdot \log(M_X \cdot 10^{\wedge}(E_X))] = 10^{\wedge}[M_Y \cdot 10^{\wedge}(E_Y) \cdot (\log(M_X) + E_X)]$. Thus, to calculate the final result, three overlapped operations are done iteratively: logarithm, multiplication, and antilogarithm. One or more correction schemes are implemented between each stage.

FIG. 1 shows a system (100) in accordance with one or more embodiments of the invention. The system (100) inputs two decimal floating-point operands (X, Y) and outputs a decimal floating-point powering of the operands (i.e., $Z=X^Y$). As shown in FIG. 1, the system (100) has multiple components including an input processing hardware unit (105), a decimal logarithm hardware unit (DLHU) (110), a decimal multiplier hardware unit (120), a shifter (130), a decimal antilogarithm hardware unit (DAHU) (140), an output formulation hardware unit (145), and a master control hardware unit (150). One or more of the hardware components (105, 110, 120, 130, 140, 145, 150) may be embedded within one or more general purpose processor cores, field programmable gate arrays (FPGAs), and/or application specific integrated circuits (ASICs).

In one or more embodiments of the invention, decimal floating-point representations divide a number (e.g., X, Y, Z) into a sign, a biased exponent, and a significand (i.e., mantissa). The quantity of bits required to represent the number depends on the specific decimal floating-point format being implemented. For example, 64 bits are required for the decimal64 format, while 128 bits are required for the decimal128 format. The precision (p) of a decimal floating-point format corresponds to the size, in decimal digits, of the significand. For example, the decimal64 format includes a significand that is 16 decimal digits in size. Accordingly, the precision of the decimal64 format is 16 (i.e., p=16). Similarly, the decimal128 format includes a significand that is 34 decimal digits in size. Accordingly, the precision of the decimal128 format is 34 (i.e., p=34). Further, decimal floating-point formats may also be used to represent positive and negative infinity, and special "not a number" (NaN) values. In one or more embodiments of the invention, the decimal floating-point operands (X, Y) and result (Z) conform with the IEEE Std 754-2008 decimal format.

In one or more embodiments of the invention, the input processing hardware unit (105) is configured to: extract the mantissae ($M_X$, $M_Y$) and the biased exponents ($E_X$, $E_Y$) from the decimal floating-point operands (X, Y); count the number of trailing zeros and/or leading zeros (leadingZeros$_X$, leadingZeros$_Y$) in each of the extracted mantissae; convert the mantissae and the biased exponents to binary coded decimal (BCD) format; and normalize (i.e., left shift) the mantissae ($M_X'$, $M_Y'$) based on the number of leading zeros. The input processing hardware unit (105) may further be configured to detect if the decimal floating-point radicand is a special value (e.g., positive infinity, negative infinity, NaNs, etc.) and forward the corresponding special square-root result to the output formation hardware unit (145).

In one or more embodiments of the invention, the master control hardware unit (150) is configured to calculate a sign of the result. The master control hardware unit (150) is configured to calculate a first correction factor (K) by subtracting a bias of the X operand and the number of leading zeros in $M_X$ from a precision of the X operand (i.e., K=P−leadingZerosX−bias), and add the correction factor to the biased exponent of the X operand ($E_X$) (i.e., $E_X$+K). The master control hardware unit (150) is also configured to calculate a second correction factor (L) by subtracting a bias of the Y operand and the number of leading zeros in $M_Y$ from a precision of the Y operand (i.e., L=P−leadingZerosY−bias), and add the correction factor (L) to the biased exponent of the operand Y ($E_Y$) (i.e., $E_Y$+L). The master control hardware unit (150) is discussed in further detail below.

In one or more embodiments of the invention, the DLHU (110) is configured to iteratively calculate $\log_{10}(M_X')$ using a digit recurrence algorithm. In one or more embodiments of the invention, the DMHU (120) is configured to iteratively calculate $M_Y' \cdot (\log_{10}(M_X') + E_X + K)$. In one or more embodiments of the invention, the shifter (130) is configured to left shift the output of the DMHU (120) by $E_Y$+L digits. The shifter (130) may also separate the integer component and the fraction component from the shifted output. The integer component may correspond to the exponent ($E_Z$) for $M_Z$. The fraction component may be sent to the DAHU (140). In one or more embodiments of the invention, the DAHU (140) is configured to iteratively calculate $10^{\wedge}[10^{\wedge}(E_Y+L) \cdot M_Y' \cdot (\log_{10}(M_X') + E_X + K)]$ (i.e., the normalized mantissa ($M_Z'$) of the result) using a digit recurrence algorithm. The rounder (147) is configured to generate a rounded version of $M_Z'$ (based on user specified parameters), and the denormalizer (148) is configured to de-normalized the rounded result based on a number of trailing zeros in $M_X$. One or more of the components (110, 120, 130, 140, 147, 148) are further discussed below.

Figure 2:
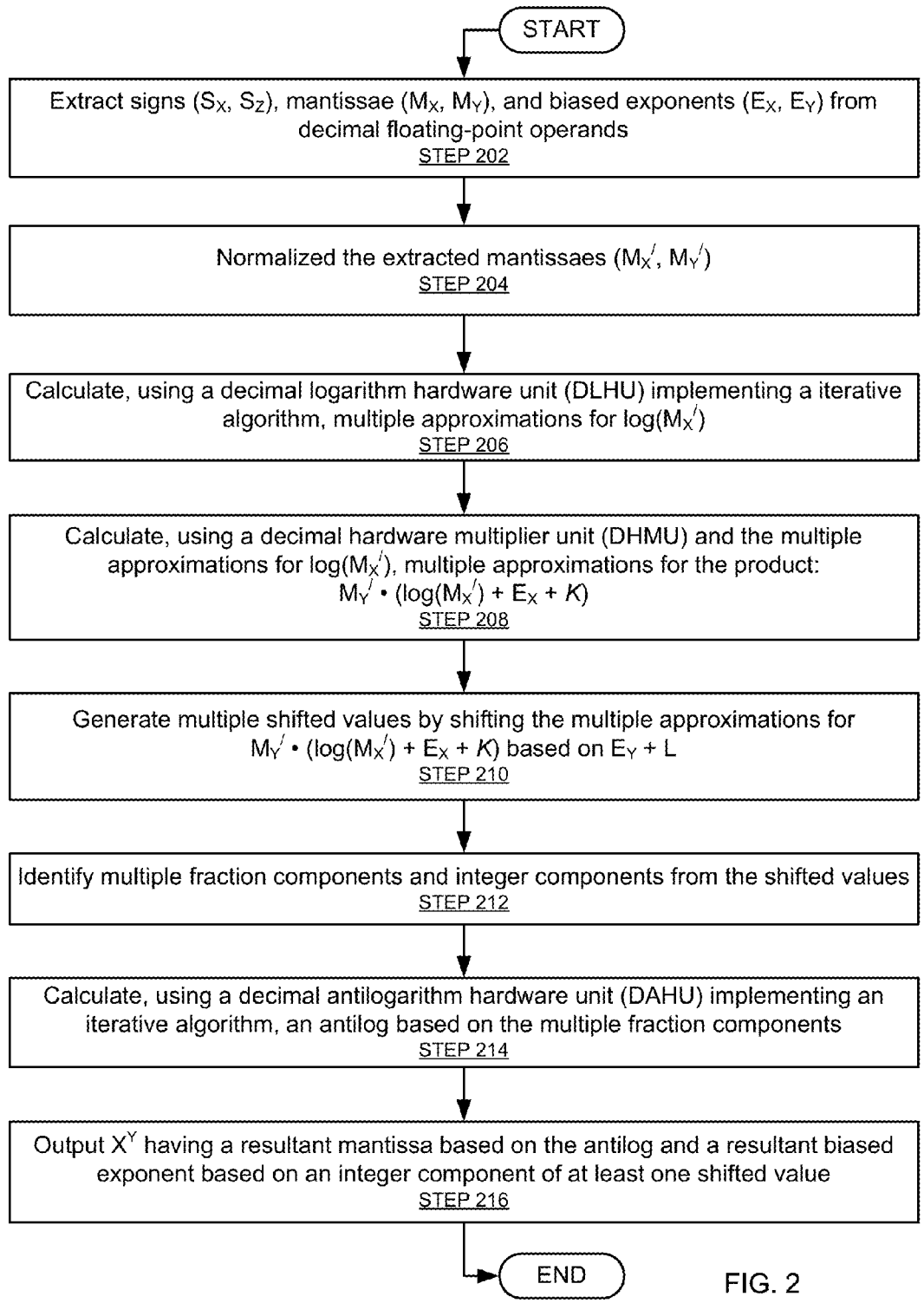
FIG. 2 shows a flowchart in accordance with one or more embodiments of the invention.

FIG. 2 shows a flowchart in accordance with one or more embodiments of the invention. The process shown in FIG. 2 may be used, for example, with the components of system (100) (e.g., DLHU (110), DMHU (120), Shifter (130), DAHU (140), discussed above in reference to FIG. 1) to execute a decimal powering computation (DPC) from two decimal floating-point operands (X, Y). One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, the signs ($S_X$, $S_Y$), the mantissae ($M_X$, $M_Y$), and the biased exponents ($E_X$, $E_Y$) are extracted form the decimal floating-point operand (202). In STEP 204, the extracted mantissae ($M_X$, $M_Y$) are normalized ($M_X'$, $M_Y'$) based on the number of leading zeros in the extracted mantissa. In STEP 206, multiple approximations for $\log_{10}(M_X')$ are calculated using a DLHU implementing an iterative algorithm. In STEP 208, multiple approximations for the product $M_Y' \cdot (\log_{10}(M_X') + E_X + K)$ are calculated based on the multiple approximations from STEP 206. In STEP 210, the output from STEP 208 is shifted by $E_Y + L$ digits resulting in $10^\wedge(E_Y+L) \cdot M_Y' \cdot (\log_{10}(M_X') + E_X + K)$. In STEP 212, each output of STEP 210 is partitioned into an integer component and a fraction component. In STEP 214, an antilog is calculated based on the multiple fraction components from STEP 212. The antilog corresponds to $10^\wedge[10^\wedge(E_Y+L) \cdot M_Y' \cdot (\log_{10}(M_X') + E_X + K)]$. In STEP 216, a floating-decimal result having a resultant mantissa based on the antilog and a biased exponent based on at least one integer component from STEP 212 is output as $X^Y$. Each of the steps (202, 204, 206, 208, 210, 212, 214, 216) is discussed further below.

Decimal Logarithmic Hardware Unit

This section presents a design and implementation of a decimal logarithmic hardware unit (e.g., DLHU (110)) based on a digit recurrence algorithm in accordance with one or more embodiments of the invention.

A valid logarithmic calculation is defined as:

$$\log_{10}(X) = \log_{10}(M_x \times 10^{E_x}) = \log_{10}(M_x) + E_x \quad (1.2)$$

Assuming a normalized $M_X$ in the form of $0 \cdot d_1 d_2 \ldots d_n \times 10^k$ where n is the required precision and k is the exponent, So:

$$\log_{10}(X) = \log_{10}(M_x) + E_x + k \quad (1.3)$$

but since normalization bounds the input to $0.1 \leq M_X \leq 0.999 \ldots 9$, then the result is bounded to $-1 \leq \log_{10}(M_X) < 0$. This facilitates the summation of $\log_{10}(M_X) + E_X + k$, as the first term is always a negative fraction (except the case of $-1$) and the other two terms are small integers. The sum can be calculated by concatenating the 9's complement of the negative fraction to the value of $E_X + k - 1$.

Digit Recurrence Algorithm:

Consider the following mathematical identity of logarithms:

$$\log_{10}(M_x) = \log_{10}\left(M_x \prod f_j\right) - \sum_{j=1}^{\infty} \log_{10}(f_j)$$

$f_j$ is an arbitrary set of numbers, but defined as $f_j = 1 + e_j 10^{-j}$ in which $M_X$ is transformed to 1 by successive multiplication. This form of $f_j$ allows the use of a shift-and-add implementation.

If the following condition is satisfied:

$$\lim_{j \to \infty} \{M_x \prod f_j\} \to 1 \quad (1.4)$$

Then, $$\lim_{j \to \infty} \{\log_{10}(M_x \prod f_j)\} \to 0 \quad (1.5)$$

Finally, $$\log_{10}(M_x) = 0 - \sum_{j=0}^{\infty} \log_{10}(f_j) \quad (1.6)$$

The corresponding recurrences for transforming $M_X$ and computing the logarithm, where $j \geq 1$, $E[1] = M_X$ and $L[1] = 0$, are as follows:

$$E(j+1) = E[j](1 + e_j 10^{-j}) \quad (1.7)$$

$$L(j+1) = L(j) - \log_{10}(1 + e_j 10^{-j}) \quad (1.8)$$

The digits $e_j$ are selected so that $E(j+1)$ converges to 1, 1 digit accuracy of the calculation result is, therefore, obtained in each iteration. After performing the last iteration of recurrence, the results are:

$$E(N+1) \approx 1 \quad (1.9)$$

$$L(N+1) \approx \log_{10}(M_x) \quad (1.10)$$

To have the selection function for $e_j$, a scaled remainder is defined as, $$W[j] = 10^j(1 - E[j]) \quad (1.11)$$

Thus, $$E[j] = 1 - W[j]10^{-j} \quad (1.12)$$

Substituting 1.12 in 1.7 yields, $$W[j+1] = 10(W[j] - e_j + e_j W[j]10^{-j}) \quad (1.13)$$

A digit $e_1$ is obtained by look-up table in the first iteration according to table 1.1. The remaining digits $e_j$ are selected by rounding the scaled remainder during the succeeding iterations. According to 1.13, the digits $e_j$ are selected according to the leading digits of W[j], and shall guarantee that W[j+1] remains bounded.

Selection by Rounding

The selected digits $e_j$ are achieved through rounding to the integer part of the residual indicated as 1.14, where $e_j \in \{-9, -8, -7 \ldots, 0, \ldots, 7, 8, 9\}$.

$$e_j = \text{round}(W[j]) \quad (1.14)$$

Then obtain 1.15:

$$-0.5 \leq W[j] - e_j \leq 0.5 \quad (1.15)$$

Since $|e_{j+1}| \leq 9$, thus, $$-9.5 < W[j+1] < 9.5 \quad (1.16)$$

Equation 1.13 can be written as:

$$W[j+1] = 10(W[j] - e_j) + e_j 10^{1-j}(W[j] - e_j + e_j) \quad (1.17)$$

According to 1.15 and 1.17, the numerical analysis for 1.16 is expanded as follows:

$$-0.5 \times 10 + e_j 10^{1-j}(-0.5 + e_j) > -9.5 \quad (1.18)$$

$$0.5 \times 10 + e_j 10^{1-j}(0.5 + e_j) < 9.5 \quad (1.19)$$

The numerical analysis results show that if and only if $j \geq 3$, the conditions 1.18 and 1.19 are satisfied. In doing so, the selection by rounding is only valid for iterations $j \geq 3$ and $e_1$ and $e_2$ can be only achieved by look-up tables. However, we can add restriction for $e_1$ so that $e_2$ can be achieved by selection by rounding and only one look-up table will be used. Because $W[1] = 10(M_x - 1)$, W[2] can be achieved as:

$$W[2] = 100 - 100 \times M_x - 10 e_1 \times M_x \quad (1.20)$$

When the value of j is 2, the value of $e_2$ is in the range of $-7 < e_2 < 7$ so that 1.18 and 1.19 are satisfied. $-7 < e_2 < 7$ is brought to 1.14, then 1.20 is obtained:

$$-6.5 < W[2] < 6.5 \quad (1.21)$$

From 1.20 and 1.21 we can obtain a conclusion that input decimal number $M_X$ must in the range of $0.5 \leq M_X \leq 1$ so that $e_2$ can be achieved by selection by rounding. The look-up table for selection for e1 is shown in table 1.1. Because $M_X$ is in the range of $0.1 \leq M_X < 1$, the input number $M_X$ in the range of $0.1 \leq M_X < 0.5$ needs to be adjusted by multiplying with 2, 3 or 5. Then the adjusted number $M_{x'}'$ is in the range of $0.5 \leq M_{x'}' \leq 1$ are calculated by selection by rounding. Finally, the logarithm results $\log_{10}(M_{x'}')$ are adjusted by subtracting the constant ($\log_{10}(2)$, $\log_{10}(3)$ or $\log_{10}(5)$) to compensate the previous multiplication and obtain the final logarithm results of $\log_{10}(M_{x'})$.

TABLE 1.1

Look up table for $e_1$ Selection

| The range of $M_x$ | $e_1$ |
|---|---|
| [0.96, 1.00) | 0 |
| [0.88, 0.95) | 1 |
| [0.81, 0.87) | 2 |
| [0.76, 0.80) | 3 |
| [0.70, 0.75) | 4 |
| [0.66, 0.69) | 5 |
| [0.62, 0.65) | 6 |
| [0.59, 0.61) | 7 |
| [0.56, 0.58) | 8 |
| [0.50, 0.55) | 9 |

Approximation of Logarithm

Logarithm result can be achieved by accumulating the values of $-\log_{10}(1+e_j 10^{-j})$ in each iteration. The values of $-\log_{10}(1+e_j 10^{-j})$ may be stored in another lookup table. With the increasing number of iterations, however, the size of the table will become prohibitively large. Therefore, the series expansion of logarithm function $\log_{10}(1+x)$ can be used to reduce the size of the look-up table:

$$\log_{10}(1+x) = \frac{\left(x - \frac{x^2}{2} + \ldots\right)}{\ln(10)} \quad (1.22)$$

Hence, after iteration $j=k$ the values of $\log_{10}(1+e_j 10^{-j})$ can be approximated by $$\frac{e_j 10^{-j}}{\ln(10)}$$

where k is the number of iterations satisfying inequality 1.23. To guarantee a predetermined accuracy of n the series approximation can be used in the iterations when the constraint $$\frac{x^2}{2\ln(10)} < 10^{-n}$$

is met where $x = e_j 10^{-j}$ $$\frac{e_k^2 10^{-2k}}{2\ln(10)} < 10^{-n} \quad (1.23)$$

Error Analysis

The error will be calculated for a predetermined generic accuracy n.

Inherent Error of Algorithm

This error due to the difference between the logarithm results obtained from finite iterations and the exact result obtained from infinite iterations. Since the decimal logarithmic result is achieved after $n^{th}$ iteration, $\epsilon_i$ can be defined as:

$$\varepsilon_i = -\sum_{j=n}^{\infty} \log_{10}(1 + e_j 10^{-j}) \quad (1.24)$$

Since $e_j$ represents the error between two successive iterations and $e_j \Sigma[-9, 9]$, we choose the worst cases ($e_j=9$ or $-9$) to analyze maximum $\epsilon_i$ $$\varepsilon_i = -\sum_{j=n}^{\infty} \log_{10}(1 \pm 9 \times 10^{-j}) \quad (1.25)$$

According to 1.25, the maximum $\epsilon_i$ is in the range:

$$-4.34 \times 10^{-n} \leq \epsilon_i \leq 4.34 \times 10^{-n} \quad (1.26)$$

Approximation Error

The approximate value $$\frac{e_j 10^{-j}}{\ln(10)}$$

is used to estimate $\log(1+e_j 10^{-j})$ from the $k^{th}$ to the $n^{th}$ iteration. According to the series expansion of logarithm function in 1.22, this produces an approximation error, $\epsilon_a$:

$$\varepsilon_a = \sum_{j=k}^{n} \frac{-\frac{(e_j 10^{-j})^2}{2} + \frac{(e_j 10^{-j})^3}{3} - \ldots}{\ln(10)} \quad (1.27)$$

Since higher order terms can be neglected because they alternate in sign and reduce the magnitude of the $$\frac{(e_j 10^{-j})^2}{2}.$$

$\epsilon_a$ can be approximated to:

$$\varepsilon_a \approx \sum_{j=k}^{n} -\frac{(e_j 10^{-j})^2}{2\ln(10)} \quad (1.28)$$

Considering the worst cases ($e_j=9$ or $-9$) we obtain the maximum $\epsilon_a$:

$$\epsilon \leq 1.78 \times 10^{-(2k-1)} \quad (1.29)$$

Quantization Error

Since only those intermediate values who have finite precisions are operated in the hardware-oriented algorithm, three quantization errors occur. First, the logarithm results are achieved by accumulating the n-digit rounding values of $-\log_{10}(1+e_j 10^{-j})$ from the $1^{st}$ to the $k^{th}$ iteration. In each iteration, the maximum rounding error of $-\log_{10}(1+e_j 10^{-j})$ is $0.5 \times 10^{-n}$ therefore the maximum $\epsilon_{q1}$ is:

$$\varepsilon_{q1} \le \sum_{j=1}^{k} 0.5 \times 10^{-n} \le 0.5k \times 10^{-n}$$

Second, the logarithm results are achieved by accumulating the n-digit rounded values of $$\frac{-e_j 10^{-j}}{\ln(10)}$$

from the $k^{th}+1$ to the $n^{th}$ iteration. Since the values of $$\frac{-e_j}{\ln(10)}$$

are precomputed and stored in a Look Up Table (LUT) for $e_j \in [-9, 9]$ followed by a shifter, the maximum rounding error of $$\frac{-e_j 10^{-j}}{\ln(10)}$$

is $0.5 \times 10^{-n}$ therefore the maximum $\varepsilon_{q2}$ is:

$$\varepsilon_{q2} \le \sum_{j=k+1}^{n} 0.5 \times 10^{-n} \le 0.5 \times (n-k) \times 10^{-n}$$

Third, the logarithm result $\log_{10}(M'_X)$ is adjusted by subtracting a finite n-digit rounded constant $(0, \log_{10}(2), \log_{10}(3)$ or $\log_{10}(5))$ in the last iteration, so the maximum $\varepsilon_{q3}$ is:

$$\varepsilon_{q3} \le 0.5 \times 10^{-n}$$

Therefore, the maximum quantization error $\varepsilon_q$ is:

$$\varepsilon_q \le \varepsilon_{q1} + \varepsilon_{q2} + \varepsilon_{q3} \le$$

$$0.5k \times 10^{-n} + 0.5 \times (n-k) \times 10^{-n} + 0.5 \times 10^{-n} \le 0.5 \times (n+1) \times 10^{-n}$$

Error Estimation

Since the final logarithm result is faithfully rounded, it has a rounding error of $\varepsilon_r = 1 \times 10^{-n}$. Hence the total error introduced is due to $\varepsilon_i, \varepsilon_a, \varepsilon_q$ and $\varepsilon_r$:

$$E_{total} = \varepsilon_i + \varepsilon_a + \varepsilon_q + \varepsilon_r$$

$$= 4.34 \times 10^{-n} + 1.78 \times 10^{-(2k-1)} + 0.5 \times (n+1) \times 10^{-n} + 1 \times 10^{-n}$$

$$= (5.84 + 0.5n) \times 10^{-n} + 1.78 \times 10^{-(2k-1)}$$

So, $$\varepsilon_{total} = (5.84 + 0.5n) \times 10^{-n} + 1.78 \times 10^{-(2k-1)} \quad (1.30)$$

Assume for example that the needed final precision n is 16 digits. And according to 1.23, k will equal 8, substituting in 1.30:

$$E_{total} = (5.84 + 0.5 \times 16) \times 10^{-16} + 1.78 \times 10^{-(2\times 8 - 1)}$$

$$= 13.84 \times 10^{-16} + 1.78 \times 10^{-15}$$

$$= 0.3164 \times 10^{-14}.$$

Therefore, according to this estimation, one can get 14-digit logarithm result with 0.3064 ulp when using a calculation precision n of 16-digits.

Architecture

In one or more embodiments of the invention, the DLHU includes two stages. Stage 1 is to obtain $e_j$ with selection by rounding. After $e_j$ is achieved, the logarithm result will be produced in stage 2.

The normalized mantissae $(M'_X, M'_Y)$ have the property: $0.1 \le M'_X, M'_Y \le 0.9999\ldots 9$. The normalized fraction $M'_X$ is adjusted into the range $0.5 \le M'_X < 1$. The $e_1$ logic takes the first two most significant digits of $M'_X$ as an input and generates the corresponding value of $e_1$ according to table 1.1.

Stage 1 implements equation 1.13 iteratively. In the first iteration, $M'_X$ and $e_1$ are fed as inputs to Stage 1, to calculate W[2] according to equation 1.20. In subsequent iterations, $W_{j+1}$ and $e_j$ are selected to be the inputs. In each iteration, $e_j$ value is used by stage 2 to calculate $\log(M'_X)$ using additions of $-\log_{10}(1+e_j 10^{-j})$ values.

First Stage

The first stage (stage1) essentially implements equation 1.13, $$W[j+1]=10(W[j]-e_j+e_j W[j]10^{-j})$$

In the first iteration (j=1) equation 1.13 reduces to $$W[2]=100-100\times M'_X - 10 e_1 \times M'_X$$

where $M'_X$ is the adjusted input fraction (multiplied by 2, 3 or 5).

Equation 1.13 can be decomposed into two parts $W[j]-e_j$ and $e_j W[j]10^{-j}$. Recall from equation 1.16 that $W[j+1]$ has an upper and lower bounds of $\pm 9.5$. Hence, $W[j]-e_j+e_j W[j]10^{-j}$ will always be a fraction bounded by $\pm 0.95$.

Calculating $W[j]-e_j$: As $e_j$ is selected by rounding $W[j]$ according to equation 1.14, $W[j]-e_j$ is always a fraction as noted above and can be calculated according to table 1.2. Table 1.2 shows a method to calculate $W[j]-e_j$ without using a Carry Propagation Adder (CPA). The first two columns show all the possible cases for rounding and the result of $W[j]-e_j$, respectively. In order to calculate the result without using a CPA, the operation is done depending on a round up signal. The round up signal is generated while computing $e_j$=round(W[j]). If W[j] has a fraction part $\ge 5$, then round_up is raised. Hence, $W[j]-e_j$ fraction can be selected to be W[j] fraction or its complement depending on W[j] sign whether it is 0 or 1, respectively. Note that $-0.4$ is the tens's complement of 0.6, and $-0.3$ in ten's complement format is 0.7. $W[j]-e_j$ sign can be calculated by XORing W[j] sign and the round_up signal.

TABLE 1.2

Illustration of the calculation of $W[j] - e_j$ term

| Example cases | $W[j] - e_j$ | W[j] sign | round_up | $(W[j] - e_j)$ fraction | $(W[j] - e_j)$ sign |
|---|---|---|---|---|---|
| $-2.4 \to -2$ | $-0.4$ | 1 | 0 | complement | 1 |
| $-2.7 \to -3$ | $0.3$ | 1 | 1 | complement | 0 |
| $2.4 \to 2$ | $0.4$ | 0 | 0 | fraction | 0 |
| $2.7 \to 3$ | $-0.3$ | 0 | 1 | fraction | 1 |

Calculating $e_j W[j]10^{-j}$: This term includes a shifting and a multiplication operation. A multiplier by one digit is used in order to multiply $e_j$(1-digit) by $W[j]$(n-digits). The used multiplier is based on the Signed Digit (SD) format. Each value of $e_j$ is decomposed into two values according to Table 1.3. The resulting two partial products are not added, instead the three vectors (two partial products from the multiplier and $W[j]-e_j$) are compressed using a three to two compressor.

TABLE 1.3

$e_j$ in SD format

| $e_j$ | 0 | 1 | 2 | 3 | 4 | 5 | 6 | 7 | 8 | 9 |
|---|---|---|---|---|---|---|---|---|---|---|
| $e_j$-SD | 00 | 01 | 02 | 03 | 04 | 1$\bar{5}$ | 1$\bar{4}$ | 1$\bar{3}$ | 1$\bar{2}$ | 1$\bar{1}$ |

Figure 3:
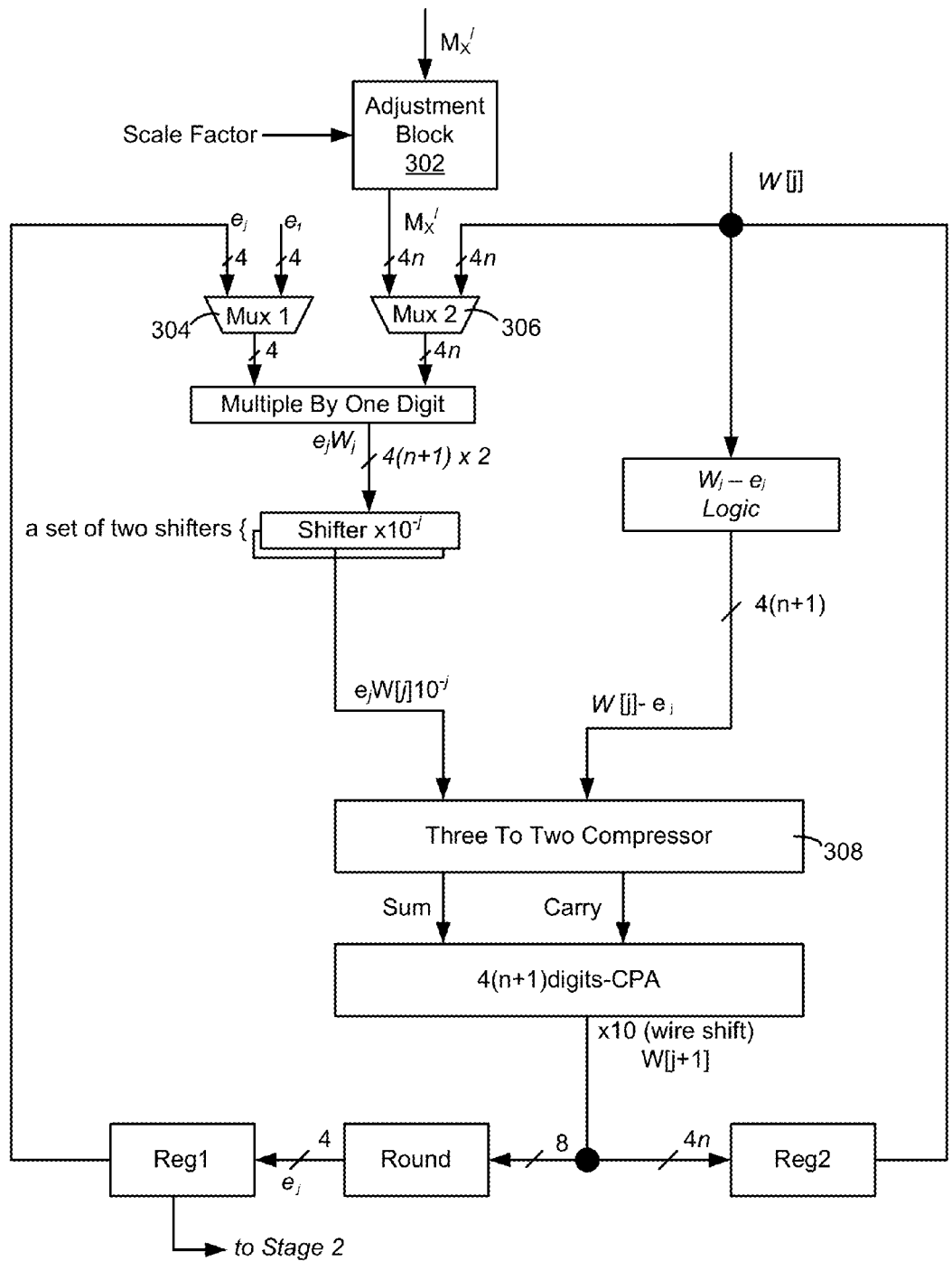
FIG. 3 shows a first stage of a decimal logarithm hardware unit (DLHU) in accordance with one or more embodiments of the invention.

FIG. 3 shows the architecture of the first stage of DLHU. In the First Iteration, Mux1 (304) and Mux2 (306) select e1 and respectively. e1 is obtained according to table 1.1 to guarantee the convergence of the digit recurrence algorithm. The adjustment block (302) multiplies $M_{x'}^j$ by a scale factor (e.g., 2, 3, or 5), if necessary, to ensure $M_{x'}^j$ is always a fraction in the range [0.5; 1). The first part of equation 1.20 ($100-100 \times M_{x'}^j$) can be thought of as the complement of $M_{x'}^j$. The result of the multiplication of e1 with $M_{x'}^j$ and $M_{x'}^j$ complement are then compressed using a three to two compressor (308). Finally, W[2] and e2 are ready at the end of the 1st iteration.

In subsequent iterations, $W[j]-e_j$ is calculated as described above. Following the same architecture, $W[j+1]$ and $e_j$ are obtained iteratively until the end of the operation after n clock cycles.

Second Stage

Figure 4:
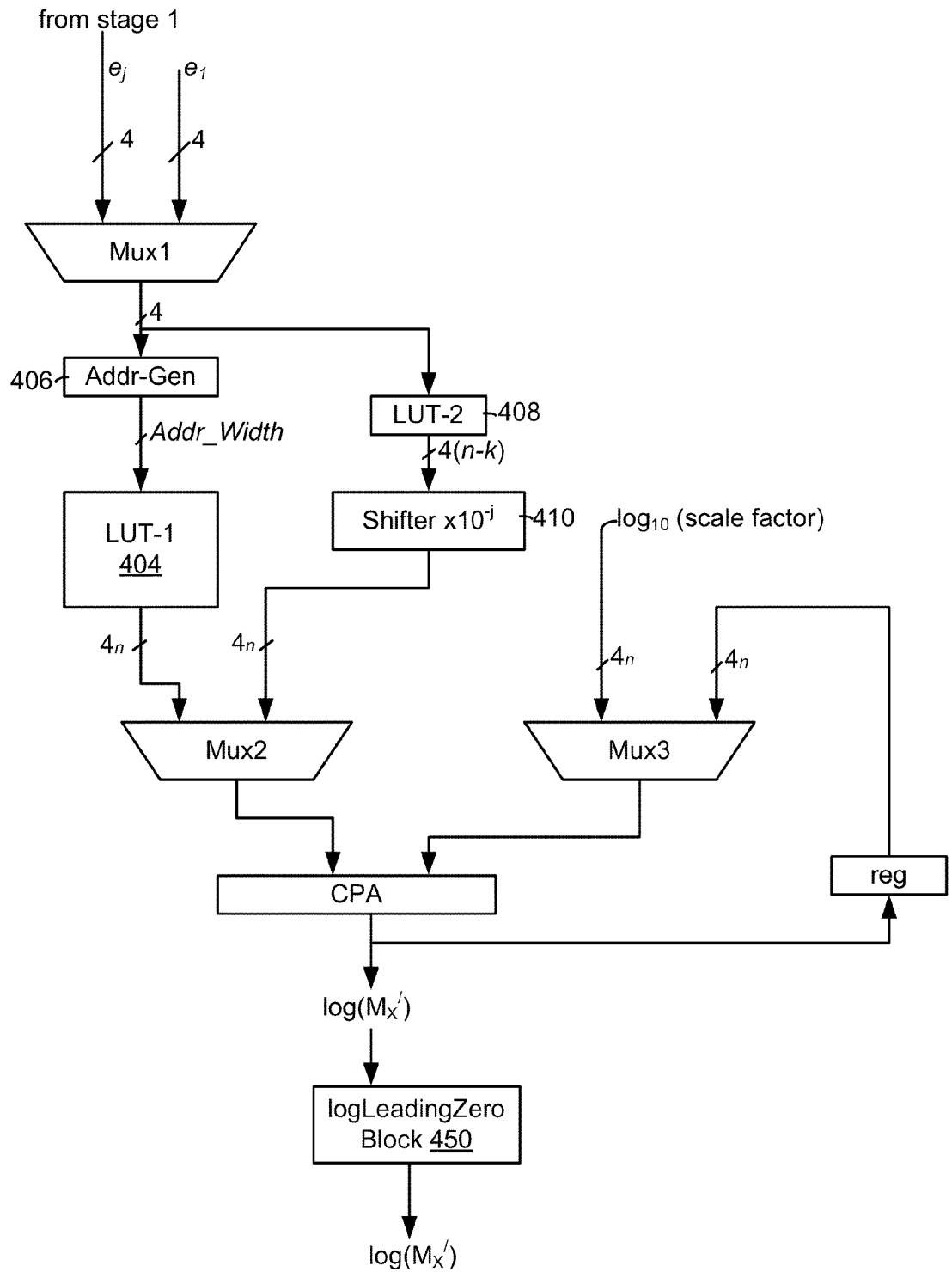
FIG. 4 shows a second stage of the DLHU in accordance with one or more embodiments of the invention.

After $e_j$ is selected by rounding $W[j+1]$ in every iteration, stage 2 calculates the final log result through accumulative additions of $-\log(1+e_j 10^{-j})$. FIG. 4 shows the architecture of the second stage of the DLHU in accordance with one or more embodiments of the invention.

An initial adjustment value is set in the CPA according to the adjusted input. Recall that input $M_{x'}^j$ needs to be adjusted into the range $0.5 \leq M_{x'}^j < 1$ in order to satisfy equations 1.20 and 1.21. For example, in order to calculate log(0.2), firstly $M_{x'}^j$ needs to be adjusted into the range by multiplying it by 3. Since log(0.2×3)=log(0.2)+log(3), then an adjustment value of log(3) needs to be subtracted from the final result.

The accumulative additions of $-\log(1+e_j 10^{-j})$ values are obtained through two phases. In the first phase, the values are stored in LUT-1 (404) and an address generator (406) is used to extract the required value from the table in each iteration. In the second phase, an approximation of the logarithm value is used.

Since $e_j \in [-9, 9]$, there are 18 possible values of $\log(1+e_j 10^{-j})$ that need to be stored for every iteration j. Note that $\log(1+e_j 10^{-j})=0$ when $e_j=0$ for any value of j, so we don't need to count for $e_j=0$. The stored data in LUT-1 (404) is partitioned into k-sections where k is the number of iterations before approximation.

The size of LUT-1 for a calculating precision of n and a number of iterations k before approximation can be calculated according to:

Size Of LUT-1=$(2+18 \times k) \times (4 \times n)$bits   (1.31)

LUT-1 contents as stored in the ROM:

| Iteration j | $E_j$ | Stored Value |
|---|---|---|
| X | 0 | 9 |
|  | −0 | −9 |
| 2 | 1 | 18 pre-calculated rounded values |
|  | −1 |  |
|  | ... |  |
|  | 9 |  |
|  | −9 |  |
| 3 | 1 | 18 pre-calculated rounded values |
|  | −1 |  |
|  | ... |  |
|  | 9 |  |
|  | −9 |  |
| ... |  | Till iteration k |

In the second phase, $$\frac{e_j 10^{-j}}{\ln(10)}$$

is used to approximate $\log(1+e_j 10^{-j})$. The LUT-2 (408) storing 18 values of $$\frac{e_j}{\ln(10)}$$

from $e_j=-9 \to 9$ is used. It is followed by a shifter (410) to implement the subsequent iterations effect $10^{-j}$. However, the shifter width can be reduced to $4 \times (n-k)$ instead of $4 \times n$. This is because after k iterations, there will be $4 \times k$ leading zeros in the $\log(1+e_j 10^{-j})$ values due to $10^{-k}$. So a constant value of $4 \times k$ can always be concatenated to the shifter output to form the approximation of $\log(1+e_j 10^{-j})$ value. Moreover, the second look up table LUT-2 (408) is addressed simply by signed $e_j$.

In every iteration, the address generator (406) generates the needed address based on the values of $e_j$ and internal set of counters. The stored data pattern can be accessed using a binary counter that generates multiples of nine in every iteration. This method is used in order to utilize the area of the used ROM to build LUT-1 (404) and to simplify the design of the generator. The regular binary pattern of the multiples of nine can be implemented using simpler set of counters which follow regular transitions as shown:

$9_{10}$    000 001 $001_2$
$18_{10}$   000 010 $010_2$
$27_{10}$   000 011 $011_2$
⋮           ⋮
$63_{10}$   000 111 $111_2$
$72_{10}$   001 001 $000_2$
$81_{10}$   001 010 $001_2$
⋮           ⋮

Some transitions such as 90→99 can alter the regular count of the simpler set of counters, So the higher order counters depend on the lower order ones. The least order 3-bit counter is initialized by 1 and is not altered through the whole generation. The higher order 3-bit counter skips a count every 7 clock cycles, for example the middle 3-bit counter doesn't count 0 in the first two set of counts (7 clock cycles each). The highest order counter is triggered every 7 clock cycles without any alteration.

After generating the correct multiple of nines in each iteration, the value of $e_j$ is added in binary format to the least significant portion of the generated vector using a 4-bit binary adder. The higher portion of the generated vector is incremented if required by the carry out of the 4-bit binary adder. Finally, the sign bit of $e_j$ is concatenated in the least significant bit of the address vector to access both positive and negative values of $e_j$.

Example: Now we want to calculate log(0.5) using the proposed digit recurrence algorithm. We will choose n to be 18, in order to satisfy equation 1.23 k will be 10. The error estimation equation 1.30 shows that the total error will be $E_{total}=1.4018\times10^{-17}$ this guarantees final precision of 17 digits with an error of $1.4018\times10^{-17}$.

Firstly the input 0.5 is fit in the range and doesn't need to be adjusted. From table 1.1 m=0.5 corresponds to $e_j$=9. And the first calculated log value is:

$$\log_1(0.5)=-\log(1+e_j10^{-j})=-\log(1+9\times10^{-1})=-0.278753600952828961$$

In the first iteration (j=1), substituting into $$W[2]=100-100\times M_x'-10e_1\times M_x'$$

So, W[2]=5 and hence, $e_2$=5 ($e_j$ is selected by rounding W[j]).

$$\log_2(0.5)=\log_1(0.5)-\log(1+5\times10^{-2})$$

$$\log_2(0.5)=-0.299942900022767034$$

In subsequent iterations until j=k=10, equation 1.13 is used to calculate W[j+1]. Hence, $e_j$ is selected by rounding.

$$W[j+1]=10(W[j]-e_j+e_jW[j]10^{-j})$$

For (j=2):

$$W[3]=10\times((5-5)+5\times5\times10^{-2})=2.5$$

Hence, $e_3$=3 and, $$\log_3(0.5)=-0.301243833043185153$$

Table 1.4 shows the values of W[j+1], $e_j$, and $\log_j$ values in every iteration. The correct final result obtained from a variable precision software library is:

$$\log(0.5)=-0.301029995663981195213738894724$$

TABLE 1.4

Calculation of log(0.5) using the digit recurrence algorithm
Calculation of log(0.5)

| Iterations (j) | W [j + 1] | $e_j$ | $\log_j$ value |
|---|---|---|---|
| 1 | don't care | 9 | −0.278753600952828961 |
| 2 | 5 | 5 | −0.299942900022767034 |
| 3 | 2.5 | 3 | −0.301243833043185153 |
| 4 | −4.925 | −5 | −0.301026631497320897 |
| 5 | 0.774625 | 1 | −0.301030974420425350 |
| 6 | −2.2536725375 | −2 | −0.301030105830592953 |
| 7 | −2.53668030154925 | −3 | −0.301029975542228839 |
| 8 | 4.63320459454840464 | 5 | −0.301029997256952392 |
| 9 | −3.66795173791365632 | −4 | −0.301029995519774460 |
| 10 | 3.32048276758150631 | 3 | −0.301029995650062805 |
| 11 | 3.20482768577651140 | 3 | −0.301029995663091639 |
| 12 | 2.04827685872656230 | 2 | −0.301029995663960228 |
| 13 | 0.48276858730658853 | 0 | −0.301029995663960228 |
| 14 | 4.82768587306588530 | 5 | −0.301029995663981943 |
| 15 | −1.72314126933873315 | −2 | −0.301029995663981075 |
| 16 | 2.76858730661270296 | 3 | −0.301029995663981205 |
| 17 | −2.31412693387296209 | −2 | −0.301029995663981196 |
| 18 | −3.14126933872962043 | −3 | −0.301029995663981195 |

From table 1.4 note that the values of $e_j$ is bounded by the inequality $-9\leq e_j\leq 9$. Recall from equation 1.4 that $e_j$ denotes the amount of error such that how much $\log_{10}(M_X\Pi f_j)$ is away from 1. These error value can be a positive or negative quantity. Hence, the values of $\log_j$ can be increased or decreased in different subsequent iterations. This results in an irregular behavior of $\log_j$ values when $\log(M_X)\to 0.000\ldots 000XXX$ or $\log(M_X)\to 0.999\ldots 999XXX$ where the final result is alternating around 0 or 1 respectively. This behavior has an impact on the online algorithm and the operation of the subsequent blocks.

Note that the error is reduced in each iteration by more than $10^{-1}$, in most cases this leads to a new correct digit in every iteration. Hence, the algorithm converges to the correct result. Although we calculated the error due to the assumed precisions to be $1.4018\times10^{-17}$ at worst case, we find that we get the complete 18 digits correctly. This is natural if the sources of error that were calculated have not been introduced in this case, however in some other cases it will be there.

Online Zeros or Nine Counting

If there is a value of $\log(M_X')+E_x$ such that there are several leading zeros in the result such as $$\log(0.999999999)\approx-0.00000000043429448 \text{ where } n=18$$

In this case there are 9 leading zeros, Now assume that $M_Y$=1 and $E_Y$=10, so the final result will be $$10^{-4.342944820000000000}\leq 0.00004539992966134$$

But the precise result is $$0.999999999^{1\times10^{10}}\approx 0.00004539992953548$$

As shown we have lost 5 digits of precision due to insufficient precise non-zero digits in the logarithm result. So we must have to count the number of leading zeros (or nines) online to prevent wrong calculation as in the previous example.

Figure 5:
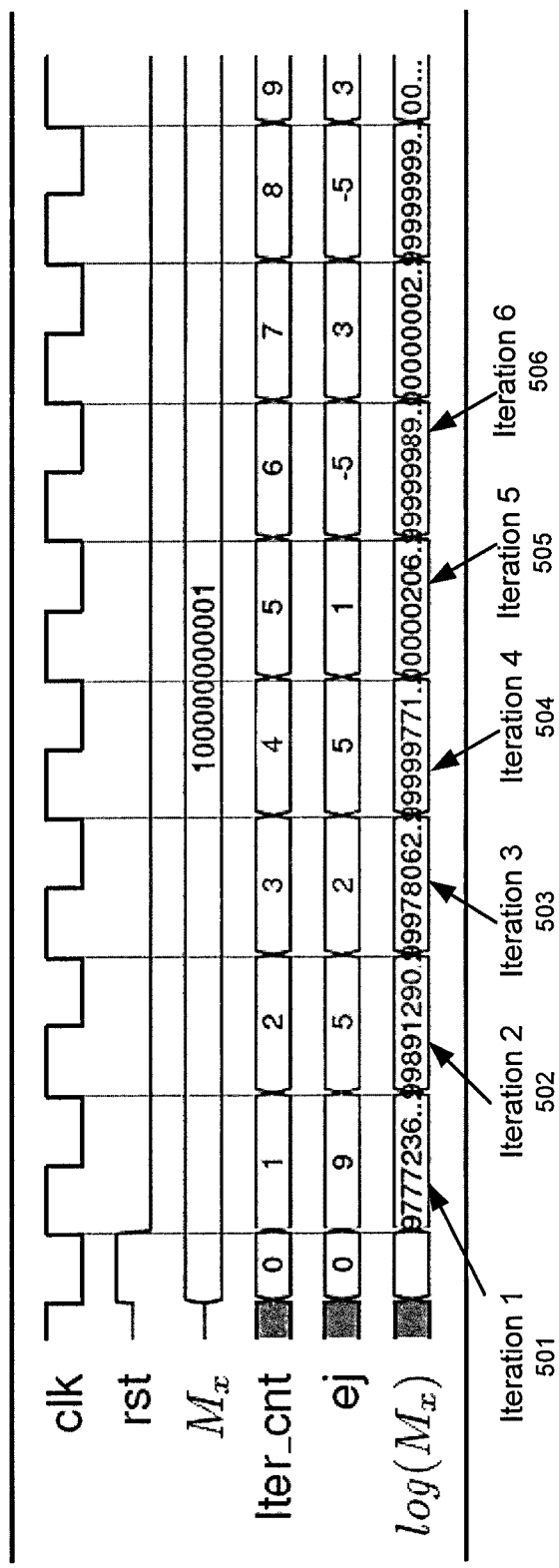
FIG. 5 shows a timing diagram in accordance with one or more embodiments of the invention.

The main issue in counting online leading zeros (or nines) is the toggling of the positive and negative error $e_j$ around 1. FIG. 5 shows a timing diagram for $M_X'$=0.100000000001, where $$\log(0.100000000001)=-0.999999999995657055$$

As shown in FIG. 5, in the first five iterations (501, 502, 503, 504, 505), a positive ej is always obtained and the additions of $|-\log(1+ej10^\wedge(-j))|$ is therefore increasing. Note that in the $5^{th}$ iteration (505), the value of $\log(M_X')$ is actually 1.00000206 but we don't care with the integer part. In the $6^{th}$ iteration (506), a negative value of ej is obtained that results in a reduction of the $\log(M_X')$ value to 0.99999989. Hence, whenever $\log(M_X')$ result is within some distance from 1, a toggling between nines and zeros in the online iterations may occur.

The online Counting leading zeros (or nines) algorithm can be decomposed into two parts:
Fixed Zeros and Nines.
Toggling Zeros and Nines.

In the first part, fixed zeros and nines, there is no toggling in log(K) result.

This can be noticed when $\log(M_X)$ is incremented either by $+\Delta$ or $-\Delta$ away from the value of '0' or '1' respectively. The algorithm is as follows:

| | |
|---|---|
| 1 | If $1^{st}$ digit is zero → start counting |
| 2 | If next digit is not zero → stop counting, else continue |
| 3 | If $1^{st}$ digit is nine → start counting |
| 4 | If next digit is not nine → stop counting, else continue |

In the second part, toggling zeros and nines, the algorithm counts toggling zeros or nines. A toggling zero may occur if the first digit is 1 and flipped into 0 in subsequent iterations which can happen due to an increment with $-\Delta$. Also the toggling nine may occur if the first digit is 8 and flipped into 9 in subsequent iterations due to an increment with $+\Delta$. The algorithm may be described as follows:

| | |
|---|---|
| 1 | If, in first iteration, $1^{st}$ digit is 0 then |
| | → count=1 when $2^{nd}$ digit ≠ 9 (will not flip) else |
| | → count=0 (if flipped) |
| 2 | If, in first iteration, $1^{st}$ digit is 1 then |
| | → count=0 when $2^{nd}$ digit ≠ 0 (will not flip) else |
| | → count=1 (if flipped) |
| 3 | If, in first iteration, $1^{st}$ at digit is 8 then |
| | → count=0 when $2^{nd}$ digit ≠ 9 (will not flip) else |
| | → count=1 (if flipped) |
| 4 | If, in first iteration, $1^{st}$ digit is 9 then |
| | → count=1 when $2^{nd}$ digit ≠ 0 (will not flip) else |
| | → count=0 (if flipped) |

Whether fixed or toggling zeros are found, the count value is passed to the master control to calculate the allowable shift amount. Only non-zero precision digits are output from the log stage to the next. The following property is considered for this decision.

$$\log_{10}(0.00 \ldots 00xyz) = \log_{10}(0.xyz \times 10^{-LeadingZeros})$$
$$= \log_{10}(0.xyz) - LeadingZeros$$

Only the first term is needed to continue the power calculations with sufficient precision digits. The 'LeadingZeros' effect is taken into consideration by the master control hardware unit (150).

Logarithm Precision Extension

As described in the previously, some leading zeros in log $(M_X')+E_X$ result with a positive value of $E_Y$ may result in a loss of precision in the final result. An extension of $\log(M_X')$ precision is necessary in order to solve this problem. The maximum leading zeros for decimal-64 and decimal-128 mode is 15 and 33 respectively. It can be denoted by p−1 where p is the precision of a specific mode. Hence the data width of logarithm calculation will be n+(p−1) instead of n only.

Referring back to FIG. 4, a logLeadingZero block (450) including a shifter is placed after the logarithm stage to get rid of the unwanted leading zeros. The shifter gets its value from the master control hardware unit (150). The shift value depends on the value of $E_Y$ and the online calculated leading zeros (or nines) of logarithm result. Since the value of the logarithm is always negative (because the input is a fraction), some leading nines in the result can be flipped to zeros when $E_X=1$. So leading nines has the same effect as zeros when $E_X=1$ and is counted as well as zeros. This is further discussed below with respect to the master control hardware unit (150).

Decimal Multiplier Hardware Unit

Multiplication is the second operation in computing $X^Y$. In one or more embodiments of the invention, the DMHU (120) is a sequential multiplier to perform the multiplication of $M_Y \times (\log(M_X')+E_X+K)$ iteratively. Specifically, $M_Y$ is the fixed multiplicand, while the multiplier is the online "correct" digit obtained from the previous 'logarithmic' stage, in every iteration. The multiplier is recoded into SD in every iteration as shown in table 1.6. See example for log(0.5) in table 1.5 with $M_X=0.5$. Two correction vectors are compressed with the two partial products using two three-to-two compressors. Finally a CPA is used to calculate the final online result.

TABLE 1.5

SD recoding of log(0.5)

| Iterative log(0.5) | SD multiplier |
|---|---|
| 027875 . . . | 0 |
| 029994 . . . | 3 |
| 030124 . . . | 0 |
| 030102 . . . | 1 |
| 030103 . . . | 0 |
| . | . |
| . | . |
| . | . |

Sources of Error

The results obtained from the logarithm stage in every iteration can maximally be varied by a value of 1. For example, when calculating log(0.5), we get:

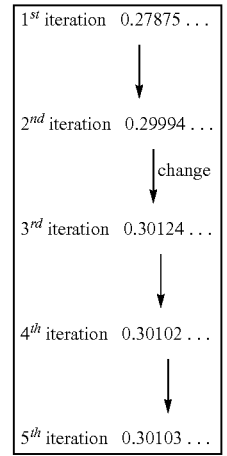

Apparently, there is a change in the second digit from 29→30 at the end of the $3^{rd}$ iteration. However, in this case, as shown in table 1.5, this change is ineffective. This can be explained by the aid of table 1.6. Note that h denotes a digit ≥5 and l denotes a digit <5.

TABLE 1.6

SD recoding - Negative sign is placed over the signed number

| digits | | SD |
|---|---|---|
| 0 | 0l | 0 |
|   | 0h | 1 |
| 1 | 1l | 1 |
|   | 1h | 2 |
| 2 | 2l | 2 |
|   | 2h | 3 |
| 3 | 3l | 3 |
|   | 3h | 4 |
| 4 | 4l | 4 |
|   | 4h | 5 |
| 5 | 5l | $\overline{5}$ |
|   | 5h | $\overline{4}$ |
| 6 | 6l | $\overline{4}$ |
|   | 6h | $\overline{3}$ |
| 7 | 7l | $\overline{3}$ |
|   | 7h | $\overline{2}$ |
| 8 | 8l | $\overline{2}$ |
|   | 8h | $\overline{1}$ |

TABLE 1.6-continued

SD recoding - Negative sign is placed over the signed number

| digits | | SD |
|---|---|---|
| 9 | 9l | $\bar{1}$ |
| | 9h | $\bar{0}$ |

Therefore, every digit followed by a digit ≥5 is recoded to the same value as if the next higher digit is followed by a digit <5. And as the logarithm result is obtained with a maximum error of '1' in its value, this region is our main concern. The only exception is at the boundaries 5 and 9 where $4h \rightarrow 5$  $9h \rightarrow \bar{0}$ $5l \rightarrow \bar{5}$  $0l \rightarrow 0$ The introduced errors due to these cases can be best shown by the following examples.

Example (1)

Assume an alternating logarithm results as shown in FIG. 5. The third column of table 1.7 represents the current multiplier digit coded into SD format.

TABLE 1.7

Alternating nines and zeroes

| Iterations | log(0.100000000001) | current digit | next digit | tail digit |
|---|---|---|---|---|
| $1^{st}$ | 09777236... | 1 | $\bar{0}$ | 1 |
| $2^{nd}$ | 09989129... | $\bar{0}$ | $\bar{0}$ | 1 |
| $3^{rd}$ | 09997806... | $\bar{0}$ | $\bar{0}$ | 1 |
| $4^{th}$ | 09999977... | $\bar{0}$ | $\bar{0}$ | 1 |
| $5^{th}$ | 00000020... | 0 | 0 | 0 |
| $6^{th}$ | 09999998... | $\bar{0}$ | $\bar{0}$ | 1 |

The next column represents the SD coding of the next digit. It is necessary to know whether the next digit is negative in order to add a tail digit to the resulting partial product. Note that the negative partial products are in the Diminished Radix Complement (DRC) and a tail digit of 1 has to be added to calculate the ten's complement. The problem is that the next digit seen in iteration j is not always the same as the current digit in iteration j+1. The first is referred to as the 'predicted' while the second the 'actual'.

Starting from the $1^{st}$ iteration, all the next (predicted) digits in a specific iteration are the same as the current (actual) digits in the following iteration. However, in the $5^{th}$ iteration, a predicted negative zero in the previous iteration is not the same as the current actual positive zero. Moreover, a negative zero in the DRC format is a train of nines. An addition of a tail digit of '1' will get the actual zero. So a correction vector has to be added in order to remove the concatenated tail digit and to fix the wrong prediction of a negative zero. This correction vector is a train of nines ending at the same position of the tail digit.

The opposite scenario may happen, which is apparent from the $6^{th}$ iteration. A wrong prediction of a positive zero has led to a tail digit of '0'. However, the next actual negative zero (train of nines in DRC format) needs a tail digit of '1', So a correction vector of a value of '1' is added at the same position of the missed tail digit.

Hence, whenever there is an alternating sequence of nines and zeros, a correction vector is added to the partial products. This vector can be a train of nines to eliminate the tail digit or a value of one added at the same position of the zero tail digit.

Example (2)

Assume an alternating logarithm results as shown in Table 1.8.

TABLE 1.8 mid point (55-54)

| Iterations | log(0.441553671) | current digit | previous digit |
|---|---|---|---|
| $1^{st}$ | 03524226... | 0 | 0 |
| $2^{nd}$ | 03552599... | 4 | 0 |
| $3^{rd}$ | 03549875... | $\bar{5}$ | 4 |
| $4^{th}$ | 03550156... | $\bar{5}$ | $\bar{4}$ |
| $5^{th}$ | 03550166... | 0 | $\bar{5}$ |
| $6^{th}$ | 03550165... | 2 | 0 |

In this case, the wrong prediction of a next negative digit is not a source of error. However, a toggling between 55 and 54 as in the $4^{th}$ iteration does make an error. In the $3^{rd}$ iteration, the current coded multiplier is $\bar{5}$ but unfortunately it has changed to $\bar{4}$ in the $4^{th}$ iteration.

The calculation in the $3^{rd}$ iteration is based on $\bar{5}$ (which can be thought of as 5) and is detected to be actually $\bar{4}$ (which can be thought of as 6) in the $4^{th}$ iteration. Hence, to overcome this miscalculation, the multiplier has to be complemented to 5 instead of $\bar{4}$ in the $4^{th}$ iteration. That is (assuming a multiplicand $M_Y=1$):

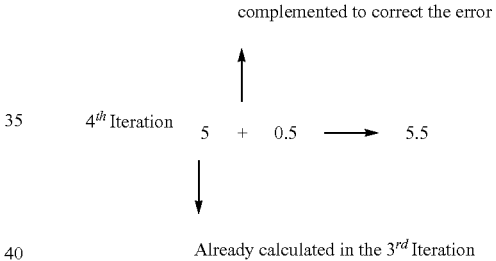

A comparison is held in every iteration between the previous and current multipliers in order to detect this sort of error (i.e., 0.5 boundary condition). The next partial product is complemented without the addition of any correction vectors.

Figure 6:
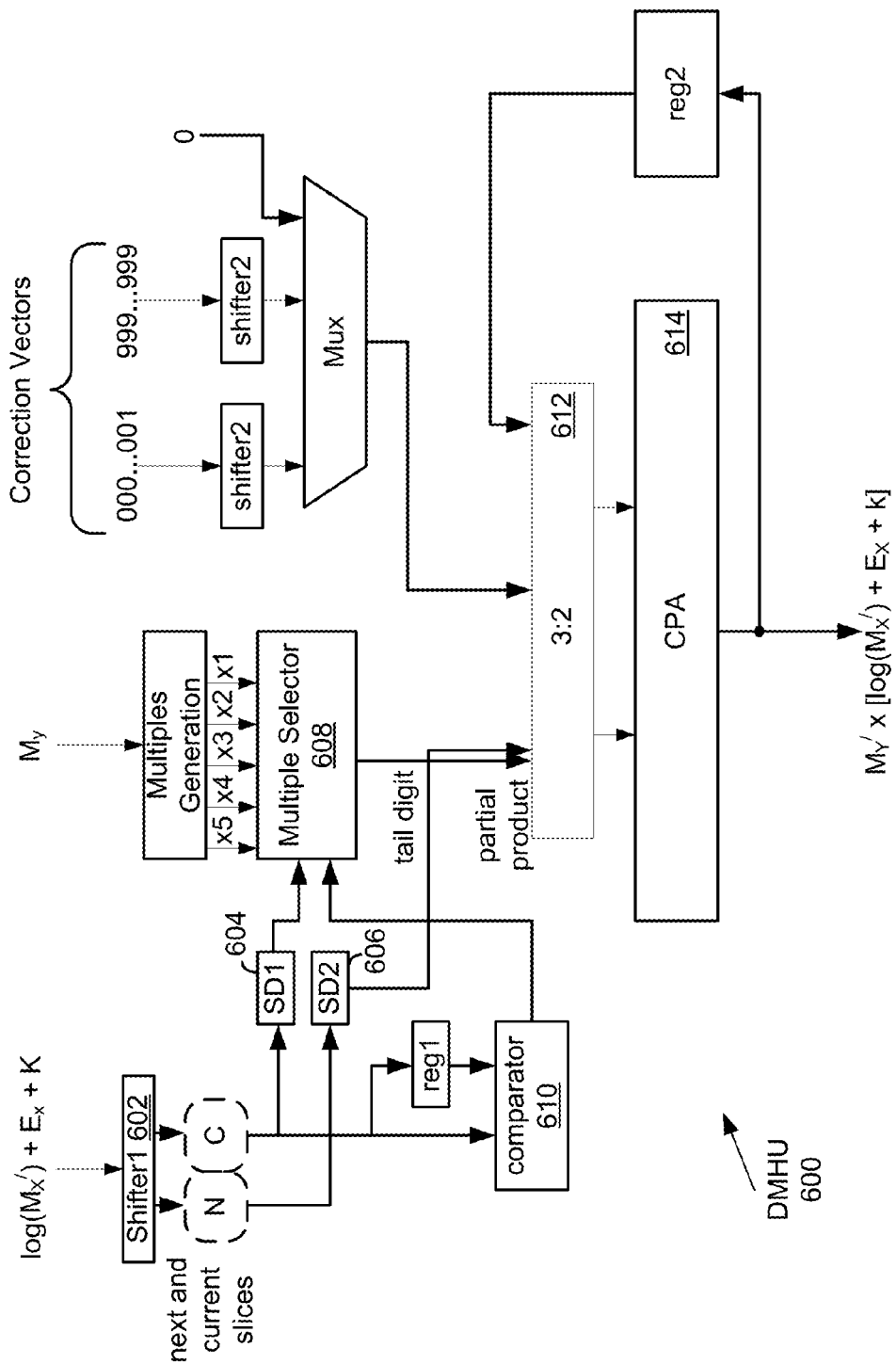
FIG. 6 shows a decimal multiplier hardware unit (DMHU) in accordance with one or more embodiments of the invention.

FIG. 6 shows a DMHU (600) in accordance with one or more embodiments of the invention. The DMHU (600) may be an example of the DMHU (120), discussed above in reference to FIG. 1. A shifter (602) following the $\log(M_X^/)+E_X+K$ value prepares the current and next slices in every iteration. SD coding blocks (604, 606) prepare the coded multiplier in order for the multiple selector (608) to select the right multiple of $M_Y^/$. The correction vector is selected depending on a comparison, using a comparator (610), between a registered multiplier and the current multiplier. The error sources discussed above are corrected through an addition of a correction vector (either +1 or −1), or choosing the complement of the next partial product, wherein the complimenting is executed by the multiple selector (608). Finally, a three to two compressor (612) followed by a Carry Propagation Adder (CPA) (614) are used to calculate $M_Y^/ \cdot [\log(M_X^/)+E_X+K]$ iteratively.

Decimal Antilogarithm Hardware Unit

Antilogarithm is the third operation in calculating powering function $X^Y$. In one or more embodiments of the invention, the DAHU is based on a digit recurrence algorithm with selection by rounding. However, the algorithm is adjusted to calculate the results online with a delay of 8 at the start of the operation.

Digit Recurrence Algorithm

A valid Decimal Floating Point (DFP) anti-logarithmic calculation is defined as:

$$Antilog_{10}(x)=10^x$$

Moreover the calculation can be decomposed to the form of:

$$Antilog_{10}(x) = 10^{x_{int}+x_{frac}}$$
$$= 10^{x_{int}} \times 10^{x_{frac}}$$

The computation results of $10^{x_{frac}}$ can be achieved through the computation of $e^m$ as shown in 1.34

$$10^{x_{frac}}=e^{x_{frac} \times \ln(10)} \quad (1.32)$$

$X_{frac}$ is in the range of (−1, 1) so $m=X_{frac} \times \ln(10)$ is in the range of (−ln(10), ln(10)). The digit recurrence algorithm to calculate $e^m$ is summarized as follows:

$$L[j+1] = m - \sum \ln(f_j) \quad (1.33)$$

Then, $$\lim_{j \to \infty} \{m - \sum \ln(f_j)\} \to 0 \quad (1.34)$$

If 1.34 is satisfied:

$$\lim_{j \to \infty} \{\sum \ln(f_j)\} \to m \quad (1.35)$$

Thus, $$10^{x_{frac}} = e^m = \prod_{j=1}^{\infty} f_j \quad (1.36)$$

$f_j$ is defined as $f_j=1+e_j 10^{-j}$ by which m is transformed to 0 by successive subtraction of $\ln(f_j)$. This form of $f_j$ allows the use of a decimal shift and add implementation. According to 1.35 and 1.38, the corresponding recurrences for transforming m and computing the antilogarithm are presented as follows:

$$L[j+1]=L[j]-\ln(1+e_j 10^{-j}) \quad (1.37)$$

$$E[j+1]=E[j] \times (1+e_j 10^{-j}) \quad (1.38)$$

In 1.37 and 1.38, $j \geq 1$, $L[1]=m$ and $E[1]=1$. The digits $e_j$ are selected so that $L[j+1]$ converges to 0. After performing the last iteration of recurrence, we obtain:

$$L[j+1] \leq 0 \quad (1.39)$$

$$E[j+1] \approx e^m = 10^{x_{frac}} \quad (1.40)$$

To obtain the selection function for $e_j$, a scaled remainder is defined as:

$$W[j]=10^j \times L[j] \quad (1.41)$$

Thus, $$L[j]=W[j] \times 10^{-j} \quad (1.42)$$

Substituting 1.42 into 1.37:

$$W[j+1]=10W[j]-10^{j+1} \times \ln(1+e_j 10^{-j}) \quad (1.43)$$

According to 1.43, the digits $e_j$ are selected as a function of leading digits of scaled remainder in a way that the residual W[j] remains bounded.

Online Algorithm

The input m is introduced in the recurrence equation 1.37 as an initial condition (L[1]=m). Hence, the residual W[j+1] in equation 1.43 carries all the information about m in the first iteration. Assume that only δ digits of the input m are ready at the start of the operation, then equation 1.43 can be adjusted [9] to:

$$W[j+1]=10W[j]-10^{j+1}\ln(1+e_j 10^{-j})+X_{jnew}10^{-1+\delta} \quad (1.44)$$

where $+X_{jnew}$ is the correct new online digits and δ is the online delay of the online antilogarithm. Taking δ=2:

$$W[j+1]=10W[j]-10^{j+1}\ln(1+e_j 10^{-j})+X_{jnew}10^1 \quad (1.45)$$

Selection by Rounding

The selection of the digits $e_j$ is achieved through rounding to the integer part of the scaled remainder indicated as 1.46, where $e_j \{-9, -8, -7, \ldots, 7, 8, 9\}$.

$$e_j=\text{round}(W[j]) \quad (1.46)$$

when $e_j$ is selected by rounding in 1.46:

$$-0.5 \leq W[j]-e_j \leq 0.5 \quad (1.47)$$

Because $|e_{j+1}| \leq 9$, $$-9.5 < W[j+1] < 9.5 \quad (1.48)$$

1.43 can be written as:

$$W[j+1]=10(W[j]-e_j)-10^{j+1} \times \ln(1+e_j 10^{-j})+10e_j \quad (1.49)$$

According to 1.47, 1.48 and 1.49 the numerical analysis is processed as follows:

$$10^{j+1} \times \ln(1+e_j 10^{-j})-10e_j > -4.5 \quad (1.50)$$

$$10^{j+1} \times \ln(1+e_j 10^{-j})-10e_j < 4.5 \quad (1.51)$$

The results in numerical analysis show that when $j \geq 2$, the conditions 1.50 and 1.51 are satisfied. So the selection by rounding is only valid for iterations $j \geq 2$ and $e_1$ can be achieved by a look up table. Note that the numerical analysis is based on equation 1.43, but it's still valid for the online algorithm of equation 1.45. Because W[1]=10m, W[2] can be achieved as:

$$W[2]=100 \times m-10^2 \times \ln(1+e_1 10^{-1}) \quad (1.52)$$

When the value of j is 2, the value of $e_2$ is obtained with selection by rounding, then (1.50) and (1.51) are satisfied. According to 1.48, W[2] satisfies:

$$-9.5 < W[2] < 9.5 \quad (1.53)$$

According to (1.52) and (1.53), we obtain:

$$100 \times m-10^2 \times \ln(1+e_1 10^{-j}) < 9.5 \quad (1.54)$$

$$100 \times m-10^2 \times \ln(1+e_1 10^{-j}) > -9.5 \quad (1.55)$$

To satisfy the conditions of (1.54) and (1.55), we conclude that when $e_1$ is selected from −9 to 9, the input number m must be in the range of [−2.39, 0.73]. Therefore, the look-up table I is constructed to all the negative input numbers m, which are in the range [−ln(10), 0]. In order to tune the positive input numbers m, (0, ln(10)], to negative, the fraction part of positive input operand $x_{frac}$ should be firstly adjusted to negative by $x_{frac}-1$ and its corresponding integer part $x_{int}$ is adjusted by $x_{int}+1$.

The results of numerical analysis show that, a single digit $e_1$ fails to create look-up table I for achieving a continuous ranges to cover all negative input numbers m. Therefore, $e_1$ is extended to 4-digit so that all negative input numbers m can be achieved. 3-digits MSDs of the input operand m are necessary to address the initial look-up table I for selection of the digit $e_1$. The look-up table is constructed by a size of $2^5 \times 16$ bits ROM in which the values of $e_1$ are stored as shown in table 1.9.

TABLE 1.9

Look Up Table I for $e_l$ selection

| Ranges of m | $e_l$ |
|---|---|
| [−0.08, 0.00] | 0.000 |
| [−0.19, −0.09] | −1.000 |
| [−0.20, −0.30] | −2.000 |
| [−0.31, −0.44] | −3.000 |
| [−0.45, −0.59] | −4.000 |
| [−0.60, −0.77] | −5.000 |
| [−0.78, −0.88] | −5.500 |
| [−0.89, −1.00] | −6.000 |
| [−1.01, −1.13] | −6.500 |
| [−1.14, −1.28] | −7.000 |
| [−1.29, −1.37] | −7.250 |
| [−1.38, −1.47] | −7.500 |
| [−1.48, −1.57] | −7.750 |
| [−1.58, −1.69] | −8.000 |
| [−1.70, −1.82] | −8.250 |
| [−1.83, −1.98] | −8.500 |
| [−1.99, −2.16] | −8.750 |
| [−2.17, −2.26] | −8.875 |
| [−2.27, −2.38] | −9.000 |

Approximation of Logarithm

The values of logarithm $\ln(1+e_j 10^{-j})$ in (1.43) can be achieved by constructing look up table II. This section will follow a similar approach to what was done in stage-1 'Log $(M_x')$'. With the increasing number of iterations, however, the size of the table will become prohibitively larger. Thus a method for reducing the table size, to achieve a significant reduction in the overall hardware requirement is necessary. A Taylor series expansion of the logarithm function $\ln(1+x)$ is demonstrated in (1.56):

$$\ln(1+x) = x - \frac{x^2}{2} + \ldots \tag{1.56}$$

After $j=k$ iterations, the values of $(\ln(1+e_j 10^{-j}))$ can be approximated by $e_j 10^{-j}$. Therefore after the $k^{th}$ iteration the values of $\ln(1+e_j 10^{-j})$ do not need to be stored in look up table II, the values of $e_j 10^{-j}$, instead, will be used for approximation.

Error Analysis and Estimation

The error will be calculated for a predetermined generic calculation precision of n−1, after n iterations.

Inherent Error of Algorithm

Since the decimal antilogarithm result is achieved after n iterations, $\epsilon_i$ can be defined as:

$$\varepsilon_i = \prod_{j=1}^{\infty}(1+e_j 10^{-j}) - \prod_{j=1}^{n}(1+e_j 10^{-j}) \tag{1.57}$$

Thus, equation (1.57) can be written as:

$$\varepsilon_i = \prod_{j=1}^{\infty}(1+e_j 10^{-j}) \times \left(1 - \frac{1}{\prod_{j=n+1}^{\infty}(1+e_j 10^{-j})}\right) \tag{1.58}$$

In (1.58), since the proposed anti-logarithmic algorithm can compute the input values, which fall in the range of (−1, 0], the exact antilogarithm results, obtained after the infinite iterations are in the range of (0.1, 1]. We substitute the worst case ($e_j=9$) and the maximum value of the exact antilogarithm results to (1.58), then the maximum $\epsilon_i$ is obtained as:

$$\varepsilon_i \leq 1 - \frac{1}{\prod_{j=n+1}^{\infty}(1+9 \times 10^{-j})} \tag{1.59}$$

In (1.59), it is obvious that:

$$\prod_{j=n+1}^{\infty}(1+9 \times 10^{-j}) = e^{\sum_{j=n+1}^{\infty} \ln(1+9 \times 10^{-j})} \tag{1.60}$$

Since the equation (1.61) is satisfied:

$$\sum_{j=n+1}^{\infty} \ln(1+9 \times 10^{-j}) < 9 \times (10^{-(n+1)} + 10^{-(n+2)} + \ldots) \tag{1.61}$$

We obtain:

$$\prod_{j=n+1}^{\infty}(1+9 \times 10^{-j}) < e^{9 \times (10^{-(n+1)} + 10^{-(n+2)} + \ldots)} \tag{1.62}$$

Thus, the maximum absolute $\epsilon_i$ is:

$$|\varepsilon_i| < 1 - \frac{1}{e^{9 \times (10^{-(n+1)} + 10^{-(n+2)} + \ldots)}} \approx 1 \times 10^{-n} \tag{1.63}$$

Quantization Error

The antilogarithm results can be obtained by n times successive multiplication as shown in (1.64)

$$10^{x.frac} = \prod_{j=1}^{n}(1+e_j 10^{-j}) \tag{1.64}$$

Since only the finite precision of intermediate multiplication results are operated in the hardware implementation, the quantization error $\epsilon_q$ is produced. The intermediate precision in our design is set to 'P+4' digits. In the first k iteration, there are no truncation errors. To prove this, we assume the opposite, an error existed at the least significant digit at an arbitrary iteration i. Multiplying $(P+4)_{digits} \times (1)_{digit}$ should have resulted in $(P+5)_{digits}$, and the error would have existed in the least significant part. But since only $(P+4)_{digits}$ are reserved from the product, the error will not exist in iteration i+1. Thus the quantization error is not taken into consideration.

However, regarding the iterations k+1 and afterwards, the truncation error $\tau=10^{-P-4}$, is produced in each iteration, and sums up to:

$$\varepsilon_q = \tau \times \left[ \sum_{i=k+1}^{n} \left\{ \prod_{j=i}^{n} (1+e_j 10^{-j}) \right\} + 1 \right] \quad (1.65)$$

and the total quantization error, $\epsilon_q$, satisfies:

$$\epsilon_q < \tau \times (e^{\sum_{j=k+1}^{n} e_j 10^{-j}} + \ldots + e^{\sum_{j=n}^{n} e_j 10^{-j}} + 1) \quad (1.66)$$

Considering the worst case ($e_j$=9) in equation 1.66, we obtain the maximum absolute $\epsilon_q$:

$$|\epsilon_q| < (n-k+1) \times 10^{-P-4} \quad (1.67)$$

Error Estimation

It's required to sum up all error sources and find the worst case error. Having only two sources of error, inherited and quantization errors, the maximum total error $\epsilon_t$ can be expressed as:

$$|\epsilon_t|=|\epsilon_i|+|\epsilon_q| \leq 10^{-n}+(n-k+1) \times 10^{-P-4} \quad (1.68)$$

It's quite clear that the first term dominates. Thus for correct n−1 digits, n iterations are needed.

Architecture

Figure 7:
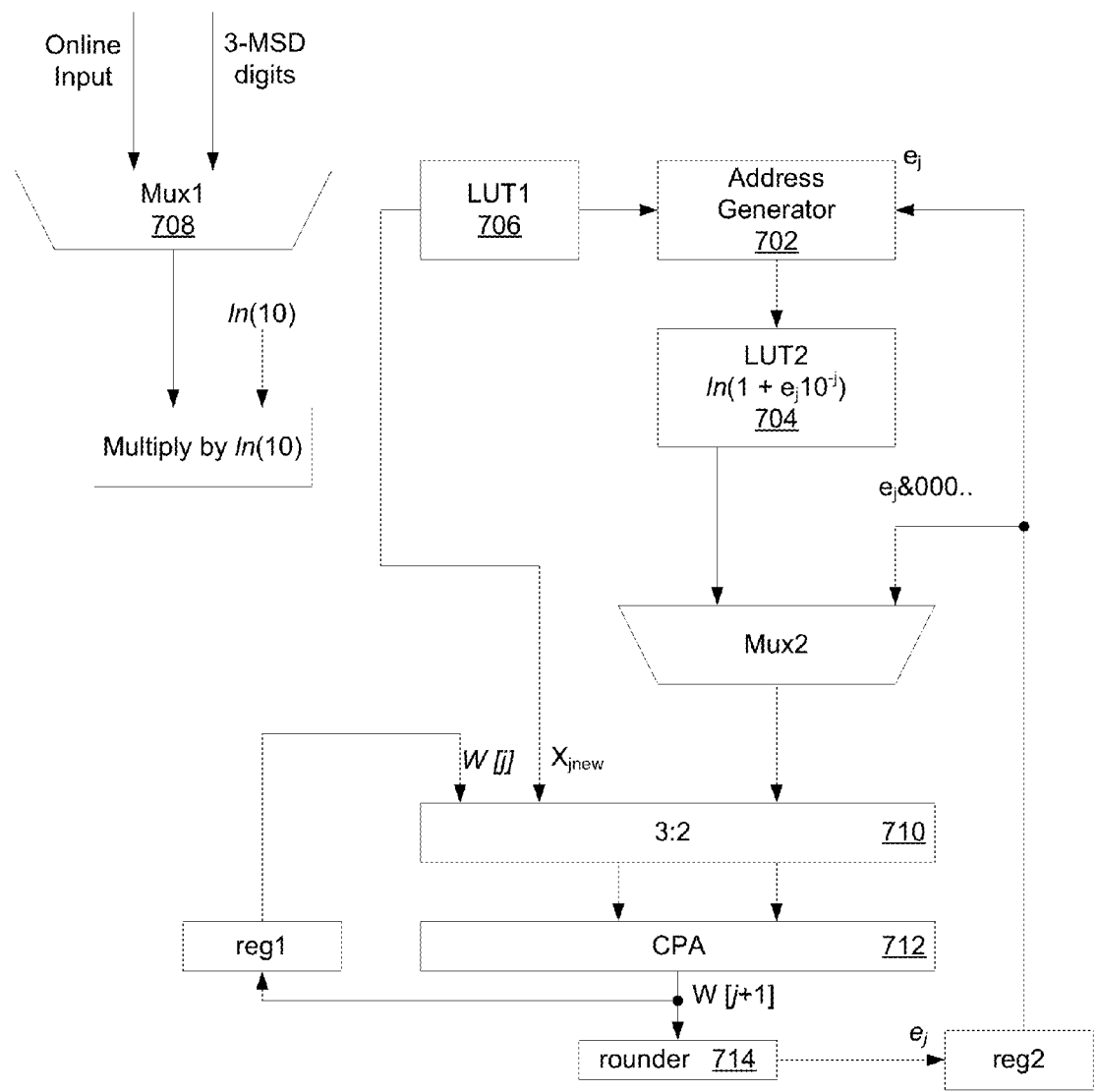
FIG. 7 shows a first stage of a decimal antilogarithm hardware unit (DAHU) in accordance with one or more embodiments of the invention.
Figure 8:
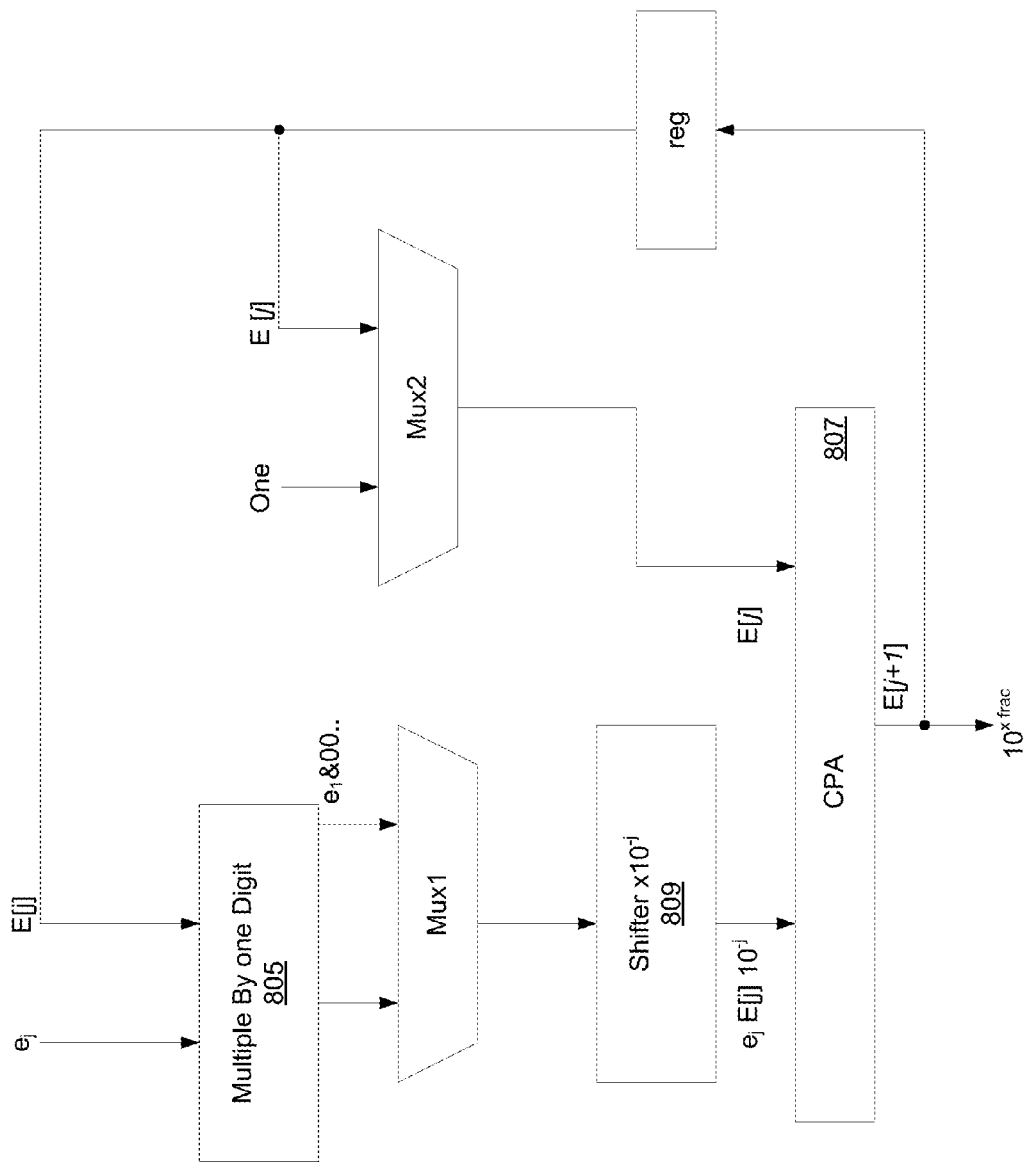
FIG. 8 shows a second stage of the DAHU in accordance with one or more embodiments of the invention.

The online antilogarithm function is divided into two stages: in the first stage ej is achieved through rounding to the integer part of the scaled remainder. Through accumulative multiplications, using ej the final antilogarithm result is calculated. FIG. 7 shows a first stage of the DAHU in accordance with one or more embodiments of the invention. FIG. 8 shows a second stage of the DAHU in accordance with one or more embodiments of the invention.

As shown in FIG. 7, 3-digits are required in the start of the operation. An address generator (702) similar to the one discussed above in reference to the DLHU, is used to access look up table II (704). e1 is selected in the first iteration from look-up table I (706) according to table (1.9). Mux1 (708) selects the 3 MSDs of the input in the first iteration. In subsequent iteration an online input (1 digit per iteration) is selected. According to equation (1.45), the three terms 10W[j], $10^{\wedge}(j+1)\ln(1+ej10^{\wedge}(-j))$ and Xjnew$10^{\wedge}(-1)$ are firstly compressed using a three-to-two (710) compressor. Note that in $10^{\wedge}(j+1)\ln(1+ej10^{\wedge}(-j))$ a shifter is not needed as the result is internally stored in look-up table II (704). Note also that Xjnew is always multiplied by $10^{\wedge}(-1)$, that it is always a fraction. The used correction scheme adds (or subtracts) a value of 1 to (or from) Xjnew to correct the online errors. Finally a CPA (712) followed by a rounder (714) is used to get the value of ej which is fed iteratively to the second stage.

The approximation for the values of $\ln(1+e_j 10^{-j})$ as discussed previously is $e_j 10^{-j}$. A right shifting by $10^{j+1}$ makes the approximated value equal to $e_j \times 10$. Hence, in the approximation phase, $e_j$ is shifted one digit place to the right and concatenated with zeros to achieve the approximation value.

In the second stage, equation (1.38):

$$E[j+1]=E[j] \times (1+e_j 10^{-j})$$

can be implemented using a n-digit multiplier. However, this will increase the required area. Equation (1.38) can be reformulated to:

$$E[j+1]=E[j]+E[j]e_j 10^{-j}$$

This form can allow us to use a Multiplier by one digit (805) followed by a CPA (807) which can decrease the used area significantly. In the first iteration, the operand of the CPA are e1 and 1. In subsequent iterations, the previously calculated E[j] is firstly multiplied by ej followed by a shifting (i.e., Shifter (809)) to the left. The result $e_j \cdot E[j] \cdot 10^{\wedge}(-j)$ is added to E[j]. The result $10^{\wedge}(\text{xfrac})$ is ready after n iterations.

Master Control Hardware Unit, De-Normalizer, Rounder, and Flags

Apart from the data path shown in the previous chapters, this section shows many internal control lines that drives the whole system. Shift amounts, iterations control and exception flags are among the outputs from the 'Master control'. Moreover, the result shall be delivered comforting the IEEE standard; this includes rounding according to the set rounding direction, de-normalization to reach the defined preferred exponent, DPD encoding and correct exceptional flags.

Master Control

After operand X gets its leading and trailing zeros counted, it's left shifted by the amount of leading zeros, thus, normalized. Values of leading and trailing zeros, in addition to the normalized operand are input to the master control. Operand Y is normalized similarly, without counting its trailing zeros, this info is not needed.

The master control hardware unit then calculates the following values

1. $E_X+K$:

$E_X$−Bias+P−LeadingZeros$_X$—In case of negative value
$E_X$−Bias+P−LeadingZeros$_X$−1—In case of positive value This behavior is needed for correct concatenation of the negative log($M_X'$) fraction. In case of negative $E_X$+K which is an integer, there is not problem concatenating the negative fraction. On the other hand, positive integers need to be decreased by a value of 1, and the negative fraction needs to be complemented.

Example: log($M_X'$)=−0.4. If $E_X$+K=−2, then $E_X$+K+log($M_X'$)=−2.4. But if $E_X$+K=2, then $E_X$+K+log($M_X'$)=1.6.

Since all exponential values are encoded in binary, they need to be converted to binary-coded decimal 'BCD' before concatenating to the Log fraction.

2. $E_Y$+L: always calculated as $E_Y$−Bias+P−LeadingZeros$_Y$
3. As discussed above, log($M_X'$) may introduce leading zeros in its result.

These zeros are meaningful if the concatenated $E_X$+K has a non-zero value. If not, loss of the result precision may occur. The master control hardware unit calculates the maximum allowable shift amount to move out those zeros. The shift amount is $E_Y$+L, but validated under two conditions:

$E_X$+k=0 with Log having leading zeros, or $\cdot E_X$+K=1 with Log having leading nines. The second case will be numerically equivalent to the first; the positive integer part, $\cdot E_X$+K, will be decremented to zero, and the negative fraction will be complemented to zeros.

The sign of $E_Y$+L is positive, left shift will occur. Thus, more precision is needed.

4. To concatenate the binary integer $E_X$+K to the BCD fraction result from Log($M_X'$), the integer part needs to be converted to BCD format (discussed below).

5. The Logarithm stage has a variable number of iterations. The master control hardware unit calculates the needed iterations. In case of a required left-shift to Log($M_X$)+Ex, then some Log digits will be shifted to the integer part, and more precision digits are required to the fraction. Thus, more iterations are needed in this case. In the opposite situation, when a right-shift is needed to the term Log($M_X'$)+Ex, less precision is needed because some digits will be thrown away to the right. Our detailed implementation calculate the number of required Logarithm iterations as:

(P+10)+($E_Y$+L); when a left-shift is required. (1.69)
(P+10)□(|$E_Y$+L|); when a right shifting, and |$E_Y$+L|<P+3

0, no log precision is required if the right shift is ≥P+3.

6. The Log stage updates the master control with the actual found-and-shifted leading zeros. This number may be less or equal to the maximum allowable shift, as discussed in point 3. So the shift amount is updated accordingly to have the value: $E_Y+L-LogLeadingZeros$ and forwarded to the shifter between the multiplier and the anti-log to continue the remaining shift amount, if any.

7. As discussed above, the anti-log input must be a negative fraction. The shifted-out integer part before the anti-log stage needs a correction by incrementing a value of 1 if it is positive. If the sign is negative, then no correction is needed, but the BCD value is complemented, and the flow continues normally. This corrected integer part will be used in point 9 to calculate the resultant exponent, $E_Z$.

8. If Y is an determined to be an integer, de-normalization to the final result shall take into consideration the trailing zeros found in X. Thus, setting an upper limit for the de-normalizer.

Example: $1000^2=1000000$, the result shall have 3×2=6 trailing zeros. Thus by multiplying the number of trailing zero (TRZ) from $M_X$ by $M_Y$, in case $M_Y$ is an integer, will give the amount of leading zeros to be preserved from de-normalization. As a novel design, we optimize our implementation for this feature to use a single digit multiplication only. This is achievable knowing that trailing zeros are always bounded from 0→P−1. Thus we have several cases as follows:

If $M_Y$ is three or more digits, the product will be more than P−1. This is an invalid case.

If $M_Y$ is two digits, and TRZ($M_X$) is one, then this case is valid if $M_Y$≤P−1. The two digits of $M_Y$ are converted from BCD to binary as the resultant product.

The only remaining case is when $M_Y$ is a single digit integer number. Thus a single digit multiplier is used.

The calculated product, $M_Y \times TRZ(M_X)$, is then input to the de-normalizer. Moreover, a special flag is raised to the rounder to prevent any possible roundup action. Thus the trailing zeros will be delivered to the output.

9. Back to complete the calculations for $E_Z$, it still needs adjustments; adding the standard-defined exponent bias, and add a corrective de-normalization factor. The final value is calculated as:

$E_z$ = Shifted-left integer part, in *BCD* format +

1 Needed correction for positive values of $E_z$ +

Bias required by the standard −

P moves the decimal point from left to right +

De-normalized Trailing Zeros

The shifted-out integer part is in BCD-8421 format, it needs to be converted to binary. The conversion is done using the BCD-to-BID converter (below). After conversion and applying the previous adjustments, it will be output as the exponent of the final result.

The shifted exponent is compared to the maximum representable exponent, following the IEEE standard, and if the exponent will not fit, an exception occurs. Depending on the exponent sign, an overflow or underflow occurs. If the sign of the "too large" exponent is positive, then it's an overflow exception, otherwise it's an underflow. For both cases, the inexact flag is raised as well.

11. Finally, the master control hardware unit detects special standard-defined cases, and sets the special result with one of the following values:

Quiet Not-a-Number (qNaN): Output when $0^0$, $NaN^{NaN}$, $-\infty^\infty$, $-1^\infty$ or $negative^{fraction}$ 1: Output when $anything^0$ or $1^{anything}$.

$\infty^{13}$: Output when $0^{-Odd\ Integer}$ or $\pm\infty^{+Odd}$.

+∞: output when $\pm 0^{Negative}$, $\pm\infty^{Positive}$,

The complete-detailed implementation follows the listed exceptions discussed below. To be able to select those exceptions, several detection circuits are needed; fraction/integer detection, odd/even detection and some special values like 0, 1, ∞ and qNaN.

Some hardware circuits are introduced to fulfill the calculation needs for the master control hardware unit.

Binary Integer to BCD Converter

This design block is used to convert binary values ranging from 0→767 as defined by the IEEE 754-2008 std, to their Binary coded decimal in 3 digits. Basically, each binary bit has a weighted value according to its position. Starting from the least significant right position bit, the values are: 1, 2, 4, 8, 16, ... $2^{position}$, where position number 0 is the right-most.

For decimal64 format, the input binary number is 10 bits. Although bits from positions 0 to 9 may sum up to 1023, but the valid values are limited to 767, the most significant 2 bits cannot have a value of 1 at the same time. This fact is defined by the standard, and our designed circuit makes use of it for better optimization. Each input bit position may add its value to the output. For example, at bit position 6, if the bit—of weight 64—has a value of 1, then two BCD digits of value '6' and '4' should be added to the output. Still in the example, if bit position 7 is raised, then three digits of value '1', '2' and '8' are added as well. Then, BCD position 0 shall add 4+8, BCD position 1 shall add 6+2 and BCD position 2 shall be 1. The complete circuit design includes all ten input bits, thus resulting in many levels of additions to reach the final BCD output.

In one or more embodiments of the invention, to optimize the design and reduce the addition levels, input bits are added on a bitlevel, not BCD digit level. On our previous example, bit-6 adds value-4 to BCD-0. But in the optimized design, it will add a value of "X1XX" to the BCD-0, where the "X" are don't care bits that may be used by another value. Still in the example, bit-7 adds value-8 to the same BCD-0, resulting in "11XX". Thus, no addition is required in this simple example. To release any ambiguity, BCD-0 shall have its output in this format "b7-b6-X-X". For the complete design, the addition levels are decreased significantly. Table 1.10 shows the complete design, and that 4 levels of adders are needed.

TABLE 1.10

| Binary Bits are added to form BCD digits |||||||||
|---|---|---|---|---|---|---|---|---|
| BCD-2 || BCD-1 ||| BCD-0 |||
| b8 | b7 | b6 | b5 | b4 | b3 | b2 | b1 | b0 |
| c1 | c0 | b8 | b6 | b5 | b7 | b4 | b4 | |
|  |  | c2 | b7 | b8 |  | b6 | b5 | |
|  |  | c1 | c0 |  |  | b8 | b8 | |

As the input range is biased, subtracting this bias (398 in case of decimal64) is needed for a correct BCD value. The sign is detected independently according to the carry-out from subtracting the bias. If the sign is negative, the input bits are inverted to their diminished radix complement, 1's complement. The biased range of 0:767 becomes −398:369. This range limits the meaningful binary bits from 0 to 8 only.

If all BCD-0 bit were '1', an accumulated value of '41' is possible. This means that three digits are needed as carry signals for BCD-1 digit. Those digits are placed within BCD-1 for correct results. To prevent BCD-0 digit from having a value in the forbidden range of [10-15], an extra 6 is added, thus proper carry signals are produced to the following BCD-1. If no carry occurs, the 6 is subtracted. Following the same manor, BCD-1 may sum to '24', this is the reason only carry bits are propagated to BCD-2.

Summing all those bit columns will end up with the needed BCD result.

BCD to Binary Integer Converter

This block converts BCD digits to their binary equivalent number. This block is logically opposite to the previously mentioned 'Binary Integer to BCD converter'. For decimal64 format 3 BCD digits are converted to 10-bits binary format. The design behind this block is simple and straight forward, each BCD digit may produce a range of binary values. According to the BCD digit, a value is selected, then all selected values (1 for each BCD digit) are added. Ranges for different BCD positions are as follow:

BCD-0: Values 0-9 may consume up to 4 binary bits
BCD-1: Values 00-99 may consume up to 7 binary bits
BCD-2: Values 000-767 may consume up to 10 binary bits For decimal64, the three selected numbers are added to get the final binary result. For example, assume the input BCD is 234, then 3 values are selected in parallel:

004→0100

030→0011110

200→0110001000

Summing those three binary number will end up with the needed binary equivalent to 234.

Rounder

The input to the Rounder is the most significant P+1 digits, while the output is P digits only. The rightmost least significant input digit is called the 'round digit'. According to the rounding direction and the value of the round digit, the result may be delivered as the leftmost P digits or an incremented-by-one copy of it.

Table 1.11 shows all possible conditions to increment the numerical result up. This is done according to values of the least significant and rounding digits and the required rounding direction.

TABLE 1.11

Result Rounding: Conditions to round up

| Rounding Direction | Sign | LSD | RD |
|---|---|---|---|
| Nearest ties to Even | ? | ? | >5 |
|  | ? | Odd | =5 |
| Away from zero | ? | ? | >0 |
| Toward Positive (+∞) | + | ? | >0 |
| Toward Negative (−∞) | − | ? | >0 |
| Toward Zero |  | Never Rounds up |  |
| Half-up | ? | ? | ≥5 |
| Half-down | ? | ? | >5 |

If a round up action is required, a value of '1' is added to the least significant digit position. In a single case when all P resultant digits are 9s, the added '1' will propagate and the result will be "1000 . . . 00". The digits are right-shifted by 1 digit place to accommodate the extra '1', this shift leads to an increase of the resultant exponent by a value of 1. In more worse case, when the result is already at the maximum value, an overflow occurs, and the special result is chosen.

De-Normalizer

After the result is rounded to P digits only, a possible final right-shift is possible. This right-shift is needed if $M_X$ had trailing zeros and the rounded number has enough trailing zeros. The master control hardware unit calculates the de-normalization amount as shown in point 8. More than just a shifter, the de-normalizer counts the trailing zeros in the rounded result and if it more than the required shift (requested from the master control hardware unit) then the shift is applied.

Finally, an acknowledge signal is raised to verify that the rounded result is shifted. The master control hardware unit then applies the correction factor.

Flags

As defined by the IEEE 754-2008 standard, all functions shall signal the invalid operation exception on signaling NaN operands, and should signal the inexact exception on inexact results. Moreover, specific per-operation behavior is defined for the power function; overflow and underflow flags are allowed.

System Parameters

According to the error analysis from the DLHU and the DAHU, and emphasized by simulation results, some system design parameters are selected. The simulation was based on several chosen corner cases, rule-based generated numbers and pseudo-random generated numbers.

1. DLHU:

For the worst case of $M_X=0.9999.99$ (all P-digits are nine), the result should have 'P' zeros followed by the required precision digits (discussed above). The worst case is when none of the zeros are needed 1, and more iterations are needed. Thus the internal precision for the log should be $n=2 \times P+\gamma$, where is the selected number of guard/extra digits. Our selection for the internal Log precision is $n=2 \times P+6$. The parameter n is, clearly, the number of required iterations as well.

As stated before, the DLHU needs to calculate $\ln(1+e_j 10^{-j})$ in the second stage. The algorithm is designed to use a LUT at the first k iterations, then start approximation for the rest of the n iterations. k is selected to be P+1 which covers the described worst case.

The output precision of the DLHU is P+6. This extra precision is needed to cover the worst case; when $M_X$ is near unity and does not add precision digits, and the required, left-shift amount is 3. Then only P+3 digits are left for the anti-log. Given P+3 correct digits, the anti-log can generate correct P+1 digits. Going forward, the rounder needs those P+1 digits to round the final result to P digits. The 3 stages are all connected and the precision allocation decision needs to consider the complete flow.

2. DMHU

The DMHU is enabled after a variable latency. This depends on the required shift amount and the detected leading zeros/nines by the DLHU (discussed above). The latency is 2 clocks+variable amount of clocks to check for the leading zeros/nines which varies between 3~P. Thus, the multiplication stage stars after 5~P+2.

The stage is enabled for P+6 iterations, following the Logarithm stage.

3. DAHU:

The DAHU is enabled after P−1 clocks.

The operation consumes: 1 initialization cycle, P+1 iterations, and a final clock for its second stage latency. Summing up to P+3 clocks, the resultant precision is P+1 digits.

Finally the rounder may round-up or truncate the P-digit result based upon the round digit, sign and the rounding direction.

Elementary Function Support

The IEEE standard defines some elementary functions, including the power function. Embodiments of the present invention may be extended to a selected subset of the elementary functions. Table 1.12 shows the selected subset of the standardized elementary functions. The last column shows the basic modifications to support each function.

The IEEE standard defines how each function shall signal the flags. Different behaviors will be shown in details for each function. Next sections will be entitled after the function groups from table 1.12.

Pow

This is the basic group with no overrides or extra blocks to implement the needed functionality. Some notes about flags signaling are listed below.

Flags and Exceptions

For the pow function:
pow(x, ±0) is 1 for any x (even a zero, quiet NaN, or infinity)
pow(±0, y) is ±∞ and signals the divideByZero exception for y an odd integer <0
pow(±0, −∞) is +∞ with no exception
pow(±0, +∞) is +0 with no exception
pow(±0, y) is +∞ and signals the divideByZero exception for finite y<0 and not an odd integer
pow(±0, y) is ±0 for finite y>0 an odd integer
pow(±0, y) is +0 for finite y>0 and not an odd integer
pow(−1; ±∞) is 1 with no exception
pow(+1, y) is 1 for any y (even a quiet NaN)
pow(x, y) signals the invalid operation exception for finite x<0 and finite noninteger y.

For the pown function (integral exponents only):
pown(x, 0) is 1 for any x (even a zero, quiet NaN, or infinity)
pown(±0, n) is ±∞ and signals the divideByZero exception for odd integral n<0
pown(±0, n) is +∞ and signals the divideByZero exception for even integral n<0
pown(±0, n) is +0 for even integral n>0
pown(±0, n) is ±0 for odd integral n>0

For the powr function:
powr(x, ±0) is 1 for finite x>0
powr(±0, y) is +∞ and signals the divideByZero exception for finite y<0
powr(±0, −∞) is +∞
powr(±0, y) is +0 for y>0
powr(+1, y) is 1 for finite y
powr(x, y) signals the invalid operation exception for x<0
powr(±0, ±0) signals the invalid operation exception
powr(+∞, ±0) signals the invalid operation exception
powr(+1, ±∞) signals the invalid operation exception
powr(x, qNaN) is qNaN for x≥0
powr(qNaN, y) is qNaN.

Log

This group of functions make use of the first stage 'Log' of the DLHU to calculate the logarithmic values of the univariate functions. Log with bases '2' or 'e' needs correction based on the following property:

$$\log_b(x) = \frac{\log_a(x)}{\log_a(b)} \quad (1.70)$$

Thus, the DMHU is used for this correction. The multiplicand is forced to one value from table 1.13 according to the required function. The DAHU is bypassed. The rounder is used normally after the result is de-normalized.

Flags and Exceptions

For all three functions in the group log(x), common notes are listed:
DivideByZero exception is signaled when x=0
Invalid operation exception is signaled when x<0
log(+∞) is +∞ with no exception
log(±0) is −∞ and signals the divideByZero exception
log(1) is +0

Exp

This group contains a set of exponentiation functions with different fixed bases: 10, 2, and e. Since the system can calculate $X^Y$, the needed exponentiations may be calculated by simply forcing operand 'X' with a value of 10, 2 or e according to the required function. A different approach is to skip the DLHU and force its output to a value of $Log_{10}(10)=1$, $Log_{10}(2)$ or $Log_{10}(e)$ according to the required function.

Flags and Exceptions

For all three functions in the group Exp, common notes are listed:
f(+∞) is +∞ and f(−∞) is +0 with no exception
Possible overflow and underflow Compound This is a single function: compound(x, n). This function is usually used in calculating compound interest, where 'x' is the annual interest while 'n' is the number of years.

Flags and Exceptions

For a standard compliant implementation, some notes are listed:
compound(x, 0) is 1 for x≥−1, +∞, or quiet NaN
compound(−1, n) is +∞ and signals the divideByZero exception for integral n<0
compound(1, n) is +0 for integral n>0

FIG. 9 shows table 1.12 regarding Supported Elementary Functions.

TABLE 1.13

Corrective Multiplicands for Log Functions

| Function | Corrective Multiplicand |
|---|---|
| log10 | 1 |
| log2 | $\frac{1}{\log_{10}(2)} \simeq 3.3219280948873623478703194294893902$ |
| log | $\frac{1}{\log_{10}(e)} \simeq 2.3025850929940456840179914546843642$ |

Numerical Examples

Example I

Basic $X^Y$

This example shows a basic power operation; pow(12.34, 2.1). The result is 195.7770748667881 and it is inexact. The following steps shows the data flow:

1. DPD operands have a hexadecimal value of: X=2230000000000534, Y=2234000000000021
2. Operands are decoded to:
_X={Sign=0, Exponent=−2+bias, Significand=0000000000001234}, _Y. {Sign=0, Exponent=−1+bias, Significand=0000000000000021}

3. Leading zeros are counted, and both operands are normalized. $M_X'=0.1234$ with an exponent correcting factor K=12, while $M_X'=0.21$ with an exponent correcting factor L=14. The correction factors are added to $E_X$ and $E_Y$ respectively as in equations 1.71 and 1.74.

4. $M_X'$ is corrected by multiplying by 5 to fit in the required range of $0.5 \leq M_X' < 1$ (discussed above).

5. According to the value of $M_X'$, $e_1$ is selected from table 1.1 to be 7.

6. W[j] is calculated according to equation 1.13, then rounded to get the following $e_j$.

7. Knowing $e_j$, L[j] is accumulated according to equation 1.8.

8. The previous two points are repeated iteratively according to the required iterations, from equation 1.69. Meanwhile, the $Log(M_X')$ is checked for leading zeros. In our example, there are none. The $Log(M_X')$ is fed on-line to the multiplier after a delay of 4 clocks21.

9. Since $M_X$ is normalized (i.e., $M_X'$), $E_X$ gets a correction factor:

$$E_x + k = E_x - \text{bias} + P - LeadingZeros_x \quad (1.71)$$
$$= (-2 + \text{bias}) - \text{bias} + 16 - 12$$
$$= 2$$

As discussed above, it is required to add $\log_{10}(M_X')+E_X+K$. As an optimization technique, we can concatenate the required number only rather than building a full-width adder. Since the log of a fraction of the range $0.1 \leq M_X' < 0.5$ will always be a negative fraction, and the term $E_X+K$ is always an integer, either positive or negative, then concatenation is possible with a correction. In case the integer $E_X+K$ is negative (or zero), then the negative fraction is simply concatenated. On the other hand, if the integer part is strictly positive (non-zero), and the fraction is negative as always, then the required action is subtracting the negative fraction from the positive integer. Our novelty comes to state that if the integer is decreased by a value of 1 (like a simple borrow) and the negative fraction is complemented, the same concatenation is still numerically valid. This subtraction needs much less hardware circuitry since the term $E_X+K$ is limited to 3 digits. Moreover, since the $Log(M_X')$ is calculated on-line, it is not possible to obtain a correct 10's complement. We chose to use the 9's complement, this is faster than propagating an extra added '1' to the least significant digit. The error due to this choice is neglected with respect to the logarithm total error in equation 1.30.

The integer part, after a possible decrement, is in a binary format. It needs to be converted to BCD before concatenating with the Log result. Two circuits, for Decimal64 and Decimal128, are used to convert from 10-bits (14-bits in case of Decimal128) with the standard defined $E_X$ range to 3 BCD digits (4 digits in case of Decimal128).

In our example, the negative $Log(M_X')$ fraction is −0.9086848 . . . , the positive integer value of $E_X+K$ is decreased from 2 to 1, then concatenated to the nines complement of the log; 001:0913151 . . . . The integer part of this number is predetermined from the first iteration, while the fraction part is calculated online by the log block. This number is then passed to the DMHU.

10. The left-to-right on-line multiplier has a fixed multiplicand $M_Y'$ and the on-line multiplier. At each iteration, three digits are selected—from the most significant left digits, and moving to the right least significant ones—from the multiplier to recode the on-line digit using the left-most 2 digits, according to table 1.6. The recoded signed-digit 'SD' is then used to select a multiple ranging from −5×, −4×, . . . , 5× then shifted to a position according to the iteration count. The shifted partial product is then accumulated to previous multiples.

determine if the next (on the future iteration) partial product is negative.

This is done using the right-most 2 digits. If the next partial product is found to be negative, then its tail digit is placed in the current partial product, right to the selected shifted multiple.

In our example, the first 3 partial products are:

| Iteration | 3-digit Window | Multiple | Partial Product |
|---|---|---|---|
| 14 | 109 | +1 | 000021000000000000000000 . . . 00 |
| 15 | 091 | +1 | 000002100000000000000100 . . . 00 |
| 16 | 913 | −1 | 999999789999999999999900 . . . 00 |

Notice at iteration 15 the tail digit to the next negative partial product. This digit compensates the value of the diminished radix complement (9's complement) for negative numbers.

11. The previous step is repeated, gaining more precision each iteration. The result is approaching to: 001.0913151 . . . ×0.21=0.22917 . . . . In our example, the value of $E_X+K$ is not high enough to fill the reserved leading zeros of the third column. In other examples, partial products may fill them.

12. The sign of the product is determined: $\text{sign}(M_Y) \oplus \text{sign}(E_X+K+Log(M_X')) \rightarrow$ positive.

13. The on-line output of the multiplier is shifted by the corrected value of $E_Y$:

$$E_y + l = E_y - \text{bias} + P - LeadingZeros_y \quad (1.72)$$
$$= (-1 + \text{bias}) - \text{bias} + 16 - 14$$
$$= 1$$

Positive shift amounts lead to a left shift, while negative values lead to right. The shifted product is then fed to the third stage; anti-log. The shifted-out integer part '2' will be used to calculate the resultant exponent.

14. Since the anti-log operand is positive, a correction is needed because the input fraction to the anti-log must be negative (discussed above). This is done by incrementing the integer part to 3, and complementing the fraction part.

15. The DAHU begins with corrective multiplication by ln(10). On the first clock, 3 ready digits are multiplied by the fixed ln(10) value. Next clocks will only have the on-line digit with the introduced correction scheme, whenever needed. In our example, the 3 most significant digits are '708'; the nine's complement of 0.291.

16. After the multiplicative correction, the input is approaching −0.7082381 . . . ×ln(10)=−1.630 . . . . According to table 1.9, the value of $e_1$ is −8.0000.

17. Starting with $e_1$, W[2] is calculated (equation 1.52) as $$W[2] = 100 \times m - 100 \times \ln(1 + e_1 \times 10^{-1})$$
$$= 100 \times -1.630230 \cdots - 100 \times \ln(0.2)$$
$$= -163.0230 \cdots + 160.94379 \ldots$$
$$= -2.07921$$

18. According to equation 1.38, $E[2]=1-0.8=0:2$ and $E[3]=E[2]\times(1+e_2*10^{-2})=0.2\times(1-0.02)=0.196$ 19. Using equations 1.38 and 1.49 iteratively, $E[j]$ and $W[j]$ are calculated, $e_j$ is the rounded value of $W[j]$. The value of $E[j]$ approaches the needed result; 0.1957770748667881365 . . . .

20. In this example, since the precise exact result needs an infinite precision, but rounded to the 16-digit decimal64, there will be no de-normalization.

21. Digits beyond position 16 will be rounded off the final result. According to the rounding direction, result sign and the round digits the result may be incremented. In our case, we assume the standard default rounding direction; round-nearest-ties-to-even. The round digits are 0.365, which will be rounded off with no increment.

22. The result sign is positive. Negative results occur under the following conditions:
$S_X$ is negative
$M_Y$ is odd 23. The result exponent, $E_Z$, has many corner cases for its calculations. For this particular example, it is quite simple:

2 (Shifted Integer Part) +

1(Anti-log Adjustment) +

$-P(M_z$ has its decimal point to the right by definition) + bias $E_z = -13 + \text{bias}$

The first line, the shifted integer part is in BCD format. It needs to be converted to binary format before been added to the other terms. Our novelties include two circuits; to convert 3 BCD digits to 10-bits binary integer for Decimal64 and to convert 4 BCD digits to 14-bit binary integer in case of Decimal128. Details of these circuits are shown in 1.5. If the shift amount was too high, so the shifted digits count exceed the defined limit, overflow occurs.

24. Finally the exception flags are output as:

| Inexact | Invalid | Overflow | Underflow | Divide-by-zero |
|---------|---------|----------|-----------|----------------|
| 1       | 0       | 0        | 0         | 0              |

25. Accordingly, this example ends up calculating the following:

$$12.34^{2.1} = 10^{(\log_{10}(0.1234)+2)\times 0.21 \times 10}$$
$$= 195.7770748667881$$

Example II

Basic $X^Y$, Zero $E_x+k$ and a Final De-Normalization

In this example, the logical flow is almost the same. The main difference is that the exact result can fit within the 16 digits of the decimal64 format. The normalized precision digits of the result ($0.1953125\times10^{-2}$) will be de-normalized by right-shifting the final result. This shift will generate leading zeros in the result ($0000000001953125\times10^{-9}$). This behavior will match the standard-defined preferred exponent; lower is better as long as we do not throw any significant digits. The steps are similar to the previous example (i.e., Example I), duplicate info is omitted.

1. DPD operands have a hexadecimal value of: X=222C0000000000A5, Y=2238000000000003

2. Operands are deCoded to:
X={Sign=0, Exponent=−3+bias, Significand=0000000000000125},
Y={Sign=0, Exponent=0+bias, Significand=0000000000000003}

3. Leading zeros are counted, and both operands are normalized. $M_X'=0.125$ with an exponent correcting factor K=13, while $M_X'=0.3$ with an exponent correcting factor L=15. The correction factors are added to $E_X$ and $E_Y$ respectively as before.

4. $M_X'$ is corrected by multiplying by 5 to fit in the required range of $0.5 \leq M_X' < 1$. Now, $M_X'=0.625$.

5. According to the value of $M_X'$, $e_1$ is selected from table 1.1 to be 6.

6. $W[j]$ is calculated according to equation 1.13, then rounded to get the following $e_j$.

7. Knowing $e_j$, $L[j]$ is accumulated 25 according to equation 1.8.

8. The previous two points are repeated iteratively. Meanwhile, the $\text{Log}(M_X')$ is checked for leading zeros. In our example, there are none. The $\text{Log}(M_X')$ is fed on-line to the multiplier after a delay of 4 clocks. It seams that 0.625 is a lucky number that hits an accurate LUT entry at the first iteration. All error residuals, $W[j]$, are of near-zero values.

9. Since Mx is normalized (i.e., $M_X'$), $E_X$ gets a correction factor:

$$E_x + k = E_x - \text{bias} + P - \text{LeadingZeros}_x$$
$$= (-3 + \text{bias}) - \text{bias} + 16 - 13$$
$$= 0$$

Accordingly, it is required to add $\log_{10}(M_X')+E_X+K$. In our example, the negative $\text{Log}(M_X')$ fraction is $-0.90308998 \ldots$, the zero integer value of $E_X+K$ is not decreased. It's concatenated to the negative fraction of the log: $-000.90308998 \ldots$. This number is then passed to the DMHU.

10. The left-to-right on-line multiplier has a fixed multiplicand $M_Y'$ and the on-line multiplier. At each iteration, three digits are selected, from the most significant left digits, and moving to the right least significant ones, to recode the on-line digit in SD format and determine if a tail digit is needed for the next negative partial product.

11. The previous step is repeated, gaining more precision each iteration. The result is approaching to: $-000.90308998 \ldots \times 0.3 = -0.270926996097583075 \ldots$.

12. The sign of the product is determined: $\text{sign}(M_Y) \oplus \text{sign}(E_X+K+\text{Log}(M_X')) \rightarrow \text{negative}$.

13. The on-line output of the multiplier is shifted by the corrected value of $E_Y'$:

$$E_y + l = E_y - \text{bias} + P - \text{LeadingZeros}_y \quad (1.73)$$
$$= (0 + \text{bias}) - \text{bias} + 16 - 15$$
$$= 1$$

Positive shift amounts lead to a left shift, while negative values lead to right. The shifted product is then fed to the third stage; anti-log. The shifted-out integer part '−2' will be used to calculate the resultant exponent.

14. Since the anti-log operand is negative, no correction is needed.

15. The DAHU begins with corrective multiplication by ln(10). On the first clock, 3 ready digits are multiplied by the fixed ln(10) value. Next clocks will only have the on-line digit with the introduced correction scheme, whenever needed. In our example, the 3 most significant digits are '709'.

16. After the multiplicative correction, the input is approaching −0.709269960975830 . . . ×ln(10)=−1.633 . . . . According to table 1.9, the value of $e_1$ is −8.000.

17. Starting with $e_1$, W[2] is calculated (equation 1.52) as $$W[2] = 100 \times m - 100 \times \ln(1 + e_1 \times 10^{-1})$$
$$= 100 \times -1.63315443905 \cdots - 100 \times \ln(0.2)$$
$$= -163.31544390 \cdots + 160.94379 \ldots$$
$$= -2.37165 \ldots$$

18. According to equation 1.38, E[2]=1−0.8=0.2 and E[3]=E[2]×(1+$e_2$*$10^{-2}$)=0.2×(1−0.02)=0.196

19. Using equations 1.38 and 1.49 iteratively, E[j] and W[j] are calculated, $e_j$ is the rounded value of W[j]. The value of E[j] approaches the needed result; 0.1953125.

20. Since the precise exact result needs only 7 digits, shifting right and adjusting the exponent to reach the standard-defined preferred exponent is called 'denormalization'. The result becomes 0000000001953125.

21. No digits are rounded-off the 16-digit.

22. The result sign is positive.

23. For this particular example, $E_Z$, is calculated as:

−2 (Shifted Integer Part) +

+0 (Anti-log Adjustment) +

+9 (De-normalization correction) +

−P($M_z$ has its decimal point to the right by definition) + bias $E_z = -9 + \text{bias}$

24. Finally the exception flags are all reset:

| Inexact | Invalid | Overflow | Underflow | Divide-by-zero |
|---|---|---|---|---|
| 0 | 0 | 0 | 0 | 0 |

25. Accordingly, the example ends up with calculating the following:

$$0.125^3 = 10^{(\log_{10}(0.125)+0)\times 0.3 \times 10}$$
$$= 0.001953125$$

Example III

Basic Overflow Scenario

This example shows a basic power operation, pow (129090912,230), that results in an overflow. This is due to the result is 32062 . . . ×$10^{1866}$ which exceeds the standard defined maximum value of $10^{369}$ for decimal64.

1. DPD operands have a hexadecimal value of: X=223800000A90699C, Y=2238000000000130

2. Operands are decoded to:
X={Sign=0, Exponent=0+bias, Significand= 0000000129090912},
Y={Sign=0, Exponent=0+bias, Significand= 0000000000000230}

3. Leading zeros are counted, and both operands are normalized. $M_X'$=0.129090912 with an exponent correcting factor K=7, while $M_Y'$=0.230 with an exponent correcting factor L=13. The correction factors are added to $E_X$ and $E_Y$ respectively as before.

4. $M_X'$ is corrected by multiplying by 5 to fit in the required range of 0.5≤$M_X'$<1. Now, $M_X'$=0.64545456.

5. According to the value of $M_X'$, $e_1$ is selected from table 1.1 to be 6.

6. W[j] is calculated according to equation 1.13, then rounded to get the following $e_j$.

7. Knowing $e_j$, L[j] is accumulated according to equation 1.8.

8. The previous two points are repeated iteratively. Meanwhile, the Log($M_X'$) is checked for leading zeros. In our example, there are none. The Log($M_X'$) is fed on-line to the multiplier after a delay of 4 clocks.

9. Since $M_X$ is normalized (i.e., $M_X'$), $E_X$ gets a correction factor $$E_x + k = E_x - \text{bias} + P - \text{Leading } Zeros_x$$
$$= (0 + \text{bias}) - \text{bias} + 16 - 7$$
$$= 9$$

Accordingly, it is required to add $\log_{10}(M_X')$+$E_X'$+K. In our example, the negative Log($M_X'$) fraction is −0.90308998 . . . , the positive integer value of $E_X'$+K is decreased to 8. It's concatenated to the nines complement of the fraction: 008.09691001 . . . . This number is then passed to the DMHU.

10. The left-to-right on-line multiplier has a fixed multiplicand '$M_Y'$' and the on-line multiplier. At each iteration, three digits are selected, from the most significant left digits, and moving to the right least significant ones, to recode the on-line digit in SD format and determine if a tail digit is needed for the next negative partial product.

11. The previous step is repeated, gaining more precision each iteration. The result is approaching to: 8.110895669011 . . . ×0.230=1.86550600387 . . . .

12. The sign of the product is determined: sign($M_Y$)⊕sign ($E_X$+K+Log($M_X'$))→positive 13. The on-line output of the multiplier is shifted by the corrected value of $E_Y$:

$$E_y + l = E_y - \text{bias} + P - \text{LeadingZeros}_y \quad (1.74)$$
$$= (0 + \text{bias}) - \text{bias} + 16 - 13$$
$$= 3$$

Positive shift amounts lead to a left shift, while negative values lead to right. The shifted product is then fed to the third stage; anti-log. The shifted-out integer part '1865' will be used to calculate the resultant exponent. But since this value is greater than the maximum standard-defined exponent, 369, then overflow occurs.

14. The special result is selected according to the rounding direction; it may be +∞ or the maximum representable number, 99...99×$10^{369}$. Assuming the default rounding direction, round-nearest-ties-to-even, the result is +∞.

15. Finally the exception flags are as:

| Inexact | Invalid | Overflow | Underflow | Divide-by-zero |
|---|---|---|---|---|
| 1 | 0 | 1 | 0 | 0 |

Example IV

On-Line Correction for the Decimal Multiplier Hardware Unit

This example shows the correction scheme between the DLHU and the DMHU. As discussed above, the result of the Logarithm may have some flipping digits, and can cause numerical errors to the next stage (i.e., multiplication). The example is $1000^{75}$. The numerical result is not shown, only the details between logarithm and multiplication is interesting in this example.

As the normal flow goes, the sequence below is applied as usual:

1. DPD operands have a hexadecimal value of: X=223c000000000080, Y=3dfe800000000000

2. Operands are decoded to:
   X={Sign=0, Exponent=1+bias, Significand=0000000000000100},
   Y={Sign=0, Exponent=−15+bias, Significand=7500000000000000}

3. $E_X$+K is calculated to be +4, but decremented to +3 due to concatenation with the negative Log fraction.

4. Log($M_X'$)+$E_X$+K=Log(0.1)+4=−1+4=3. To reach the exact value of 3, the Log iterations make some digit flip when approaching the boundary of unity; 0.999~1.000. Trailing non-zero digits are beyond P+5 range of correct digits.

5. 3 digits are fed on-line to the multiplier, the first two are used to encode the multiplier signed digit (SD), while the last two are used to predict the sign of the next digit, to add a possible tail digit.

6. The current SD is compared to the previous next, if they differ, then an increment or a decrement had occurred.

7. According to increment/decrement signals, the correction factor is chosen and added to the current selected multiple:

As shown in FIG. 10, on clock 4: The next SD was seen positive, no tail digit added. On clock 5, the current SD is negative, the missing tail digit is inserted at the correct position according to an iteration counter.

Still referring to FIG. 10, on clock 5: The next SD was seen negative, a tail digit is added. On clock 6, the current SD is positive, a leading train of nines are added to carry-out the wrongly inserted tailing '1'.

Similar errors and corrections are found on clock 7 and 11, respectively, as shown in FIG. 10.

8. This novel correction scheme fixes many cases other than Log(0.1).

Whenever the numerical result is near the unity boundary (0.xyz00000000abc) or the tie boundary (0.xzy50000000abc), this correction scheme is a must.

9. The on-line accumulation of all partial products and the correction factors, will converge to the correct numerical product 2.25000...00.

Example V

On-Line Correction for the Decimal Antilogarithm Hardware Unit

This example shows the correction scheme between the DMHU and the DAHU. As discussed above, the result of the on-line multiplication may have some flipping digits, and can cause numerical errors to the next stage: anti-log. The example is $20000^3$. The numerical result is not of interest, only the details between multiplication and the antilogarithm is interesting in this example.

As the normal flow goes, the sequence below is applied as usual:

1. Operands are decoded to:
   X={Sign=0, Exponent=1+bias, Significand=00000000000200000},
   Y={Sign=0, Exponent=−6+bias, Significand=00000000003000000}

2. The term $E_X$+K=5.301029995663... is multiplied by the normalized $M_Y'$=0.3. The product is approaching: 1:590308998699....

3. The product is then shifted with the value $E_Y$+L=−6+16−9=1. The positive value is a left-shift. The integer part, 15, is shifted out, while the fraction is fed to the DAHU.

4. Due to the positive value of the product, the fraction fed to the antilog must be corrected to be negative. The integer part is incremented to 16, and the fraction is complemented. Thus the input to the antilog is −0:096910013....

5. Due to initial conditions constraints on $e_1$, the 3 most significant digits are needed to address e1. The 3 digit data path is used only on the first iteration, and a single digit is fed afterwards in the next iterations. The correction scheme makes use of those unused digit places to insert correction digits.

6. After the initial iteration where all 3 digits are used, the 3 input digit to the DAHU are selected as follows:
   00D: No correction needed. Here, 'D' is the on-line digit.
   01D: The previous on-line digit has flipped to the higher value, incremental correction is applied by adding an extra '1' to the tens place.
   00$\overline{D}$: The previous on-line digit has flipped to the lower value, decremental correction is applied by replacing '1' with its ten's complement. This is numerically equivalent to subtracting 1 from the previous multiple.

7. FIG. 11 shows a real example: At the fourth clock the input is flipped to a higher value. A correction is applied by adding '1' to the tens place, thus incrementing the current multiple to compensate the previous one.

8. As seen from the table, the resultant antilog is sticking to 8. A final de-normalization is done, since both operands are integers. The final result is $0008000000000000 \times 10^3$.

The system(s) and processes described in this detailed description may be used in any application requiring decimal calculations, including (but not limited to) applications of: finance, taxation, investments, transportation, commerce, energy consumption, energy pricing/purchasing, etc.

Figure 12:
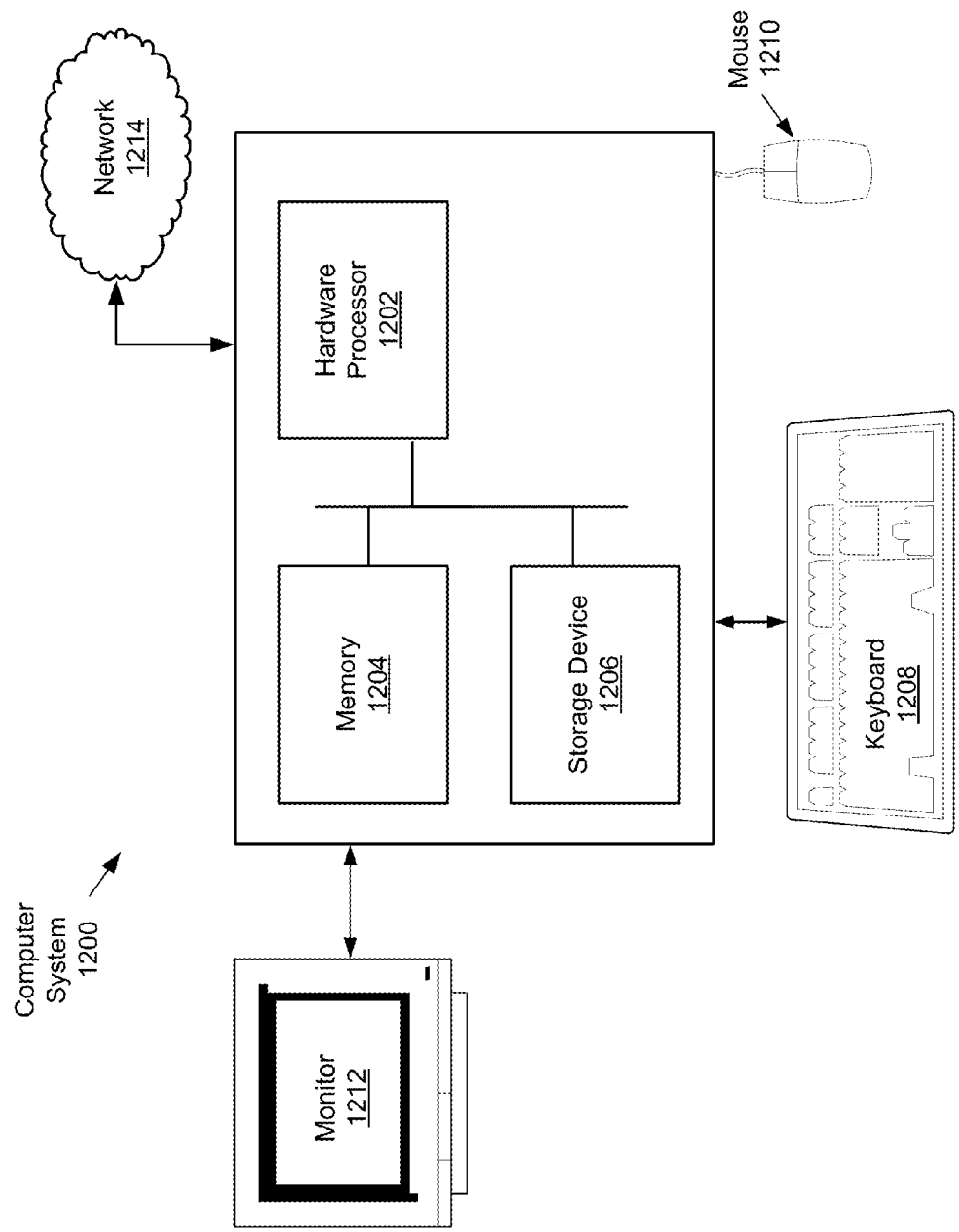
FIG. 12 shows a computer system in accordance with one or more embodiments of the invention.

Embodiments of the invention may be implemented on virtually any type of computer regardless of the platform being used. For example, as shown in FIG. 12, a computer system (1200) includes one or more hardware processor(s) (1202) (such as a central processing unit (CPU), integrated circuit, etc.), associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). The computer system (1200) may also include input means, such as a keyboard (1208), a mouse (1210), or a microphone (not shown). Further, the computer system (1200) may include output means, such as a monitor (1212) (e.g., a liquid crystal display (LCD), a plasma display, or cathode ray tube (CRT) monitor). The computer system (1200) may be connected to a network (1214) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (1200) includes at least the minimal processing, input, and/or output means necessary to practice embodiments of the invention.

Further, in one or more embodiments of the invention, one or more elements of the aforementioned computer system (1200) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a decimal elementary function (DEF) computation from a first decimal floating-point operand (DFPO) operand and a second DFPO, comprising:

extracting a first mantissa and a first biased exponent from the first DFPO and a second mantissa and a second biased exponent from the second DFPO;

generating a first normalized mantissa by shifting the first mantissa based on a number of leading zeros in the first mantissa;

generating a second normalized mantissa by shifting the second mantissa based on a number of leading zeros in the second mantissa;

calculating, using a decimal logarithm hardware unit (DLHU) implementing a first digit recurrence algorithm, a plurality of approximations for a logarithm of the first normalized mantissa;

calculating, using a decimal multiplier hardware unit (DMHU) and the plurality of approximations for the logarithm, a plurality of approximations for a product of the second normalized mantissa and a first sum based on the logarithm of the first normalized mantissa and the first biased exponent;

generating a plurality of shifted values by shifting the plurality of approximations for the product based on the second biased exponent;

generating a plurality of fraction components from the plurality of shifted values;

calculating, using a decimal antilogarithm hardware unit (DAHU) implementing a second digit recurrence algorithm, an antilog based on the plurality of fraction components; and outputting a decimal floating-point result of the DEF computation comprising a resultant mantissa based on the antilog and a resultant biased exponent based on at least one integer component of at least one of the plurality of shifted values.

2. The method of claim 1, further comprising:

scaling the first normalized mantissa by a scale factor in response to the first normalized mantissa being less than 0.5; and subtracting a logarithm of the scale factor from an output of the first digit recurrence algorithm.

3. The method of claim 1, further comprising:

calculating a first correction factor by subtracting a bias of the first biased exponent and the number of leading zeros in the first mantissa from a precision of the first DFPO;

generating a second sum by adding the first correction factor and the first biased exponent; and adding, before calculating the plurality of approximations for the product, the second sum to an approximation of the logarithm.

4. The method of claim 3, further comprising:

calculating a second correction factor by subtracting the bias and the number of leading zeros in the second mantissa from the precision of the first DFPO;

generating a third sum by adding the second correction factor and the second biased exponent; and shifting, in response to the second sum equaling zero and the third sum being positive, an approximation for the logarithm by a number of leading zeros in the approximation for the logarithm, wherein shifting at least one of the plurality of approximations for the product is further based on the second correction factor and the number of leading zeros in the approximation for the logarithm.

5. The method of claim 1, wherein calculating the plurality of approximations for the product comprises:

identifying a current slice and a next slice of a first approximation for the logarithm;

coding the current slice of the first approximation for the logarithm to a first signed-digit (SD);
coding the next slice of the first approximation for the logarithm to a second SD;
selecting a first multiple of the second normalized mantissa corresponding to the first SD;
shifting the first multiple based on an iteration being executed by the DMHU; and
adding, in response to the second SD being negative, a tail digit of one to the first multiple after shifting.

6. The method of claim 5, further comprising:
identifying a current slice and a next slice of a second approximation for the logarithm;
coding the current slice of the second approximation for the logarithm to a third SD;
selecting a second multiple of the second normalized mantissa corresponding to the third SD;
shifting the second multiple based on an iteration being executed by the DMHU; and
removing, in response to the third SD being positive, the tail digit by adding a correction vector to the second multiple after shifting.

7. The method of claim 1, wherein calculating the plurality of approximations for the product comprises:
identifying a current slice of a first approximation for the logarithm;
identifying a current slice of a second approximation for the logarithm;
coding the current slice of the second approximation for the logarithm to a signed-digit (SD);
selecting a multiple of the second normalized mantissa corresponding to the SD; and
complimenting the multiple in response to a 0.5 boundary condition between the current slice of the first approximation for the logarithm and the current slice of the second approximation for the logarithm.

8. The method of claim 1, further comprising:
identifying a fraction component and an integer component of a shifted value;
subtracting, before calculating the antilog, one from the fraction component in response to the fraction component being positive; and
adding, in response to subtracting one from the fraction component, one to the integer component.

9. The method of claim 1, further comprising:
identifying a number of trailing zeros in the first mantissa;
generating a rounded version of the antilog; and
de-normalizing the rounded version based on the number of trailing zeros.

10. The method of claim 1, further comprising:
incrementing, in response to the DEF being a compound operation, the first DFPO by one.

11. A system for executing a decimal elementary function (DEF) computation from a first decimal floating-point operand (DFPO) operand and a second DFPO, comprising:
an input processing hardware unit (IPHU) configured to:
generate a first normalized mantissa from a first mantissa extracted from the first DFPO based on a number of leading zeros in the first mantissa; and
generate a second normalized mantissa from a second mantissa extracted from the second DFPO based on a number of leading zeros in the second mantissa;
a decimal logarithm hardware unit (DLHU) configured to calculate a plurality of approximations for a logarithm of the first normalized mantissa using a first digit recurrence algorithm;
a decimal multiplier hardware unit (DMHU) configured to calculate a plurality of approximations for a product of the second normalized mantissa and a first sum using the plurality of approximations for the logarithm,
wherein the first sum is based on the logarithm of the first normalized mantissa and a first biased exponent extracted from the first DFPO;
a shifter configured to generate a plurality of shifted values by shifting the plurality of approximations for the product based on a second biased exponent extracted from the second DFPO;
a decimal antilogarithm hardware unit (DAHU) configured to calculate, using a second digit recurrence algorithm, an antilog based on a plurality of fraction components generated from the plurality of shifted values; and
an output formulation hardware unit configured to generate a decimal floating-point result of the DEF comprising a resultant mantissa based on the antilog and a resultant biased exponent based on at least one integer component of at least one of the plurality of shifted values.

12. The system of claim 11, wherein the DLHU comprises:
an adjustment block configured to scale the first normalized mantissa by a scale factor in response to the first normalized mantissa being less than 0.5; and
an adder to subtract a logarithm of the scale factor from an output of the first digit recurrence algorithm.

13. The system of claim 11, wherein the IPHU is further configured to:
calculate a correction factor by subtracting a bias of the first biased exponent and the number of leading zeros in the first mantissa from a precision of the first DFPO; and
generate a second sum by adding the correction factor and the first biased exponent,
wherein the second sum is added to an approximation of the logarithm using a wire concatenation.

14. The system of claim 13, wherein the DLHU comprises:
a logLeadingZero block configured to shift, in response to at least the second sum being zero, an approximation of the logarithm by a number of leading zeros in the approximation of the logarithm,
wherein shifting at least one of the plurality of approximations for the product is further based on the number of leading zeros in the approximation of the logarithm.

15. The system of claim 11, wherein the DMHU comprises:
a first signed-digit (SD) coding block configured to code a current slice of a first approximation for the logarithm to a first signed-digit (SD) and a current slice of a second approximation for the logarithm to a second SD;
a multiple selector configured to select a first multiple of the second mantissa based on the first SD and a second multiple of the second mantissa based on the second SD; and
a second SD coding block configured to code a next slice of the first approximation for the logarithm to a third SD and concatenate a tail digit of one to the first multiple in response the third SD being negative.

16. The system of claim 15, wherein the DMHU further comprises:
a compressor configured to add, in response to the second SD being positive, a correction vector to the second multiple to remove the tail digit.

17. The system of claim 11, wherein the DMHU comprises:
a first signed-digit (SD) coding block configured to code a current slice of a first approximation for the logarithm to a first SD and a current slice of a second approximation for the logarithm to a second SD;

a comparator configured to identify a 0.5 boundary condition between the current slice of the first approximation for the logarithm and the current slice of the second approximation for the logarithm; and a multiple selector configured to select a multiple of the second mantissa based on the second SD and compliment the multiple based on an output of the comparator.

18. The system of claim 11, further comprising:

a master control hardware unit configured to calculate a sign of the decimal floating-point result and to calculate a correction factor by subtracting a bias of the second biased exponent and the number of leading zeros in the second mantissa from a precision of the second DFPO.

19. The system of claim 11, wherein the shifter further comprises functionality to:

subtract one from a fraction component in response to the fraction component being positive; and add, in response to subtracting one from the fraction component, one to an integer component corresponding to the fraction component.

20. The system of claim 11, wherein the DAHU comprises:

a first stage configured to select only one digit from an approximation of the product during an iteration; and a second stage configured to calculate the antilog based on an output from the first stage.

21. The system of claim 11, further comprising:

a rounder configured to generate a rounded version of the antilog; and a de-normalizer configured to denormalize the rounded version based on a number of trailing zeros in the first mantissa.

22. A system for calculating a logarithm of a decimal floating-point operand (DFPO) to a base (B), comprising:

an input processing hardware unit (IPHU) configured to:
extract a mantissa and a biased exponent from the DFPO; and
generate a normalized mantissa by shifting the mantissa based on a number of leading zeros in the mantissa;

a decimal logarithm hardware unit (DLHU) configured to calculate a plurality of approximations for a logarithm of the normalized mantissa to base 10 using a digit recurrence algorithm;

a decimal multiplier hardware unit (DMHU) configured to calculate a product of a sum and an inverse of a logarithm of B to base 10 using the plurality of approximations, wherein the sum is based on the biased exponent and the logarithm of the normalized mantissa to base 10; and an output formulation hardware unit configured to generate a decimal floating-point result of the logarithm of the DFPO comprising a resultant mantissa based on the product and a resultant biased exponent based on the exponent and the number of leading zeros.

23. The system of claim 22, wherein the IPHU is further configured to increment the DFPO operand by one before generating the normalized mantissa.

24. A system for calculating a base (B) raised to a decimal floating-point operand (DFPO), comprising:

an input processing hardware unit configured to:
extract a mantissa and a biased exponent from the DFPO; and
generate a normalized mantissa by shifting the mantissa based on a number of leading zeros in the mantissa;

a decimal multiplier hardware unit (DMHU) configured to calculate a product of the normalized mantissa and a logarithm of B to base 10;

a shifter configured to generated a shifted value by shifting the product based on the biased exponent and the number of leading zeros;

a decimal antilogarithm hardware unit (DAHU) configured to calculate an antilog of a fraction component of the shifted value using a digit recurrence algorithm; and an output formulation hardware unit (OFHU) configured to generate a decimal floating-point result comprising a resultant mantissa based on the antilog and a resultant biased exponent based on at least an integer component of the shifted value.

25. The system of claim 24, wherein the OFHU is further configured to subtract one from the decimal floating-point result.

* * * * *